United States Patent
Schwarz

(10) Patent No.: US 12,015,777 B2
(45) Date of Patent: Jun. 18, 2024

(54) SIGNALING PROFILE LEVEL EXEMPTIONS FOR IMMERSIVE VIDEO

(71) Applicant: Nokia Technologies Oy, Espoo (FI)

(72) Inventor: Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 37 days.

(21) Appl. No.: 17/544,024

(22) Filed: Dec. 7, 2021

(65) Prior Publication Data

US 2022/0191498 A1    Jun. 16, 2022

Related U.S. Application Data

(60) Provisional application No. 63/125,086, filed on Dec. 14, 2020.

(51) Int. Cl.
| | |
|---|---|
| *H04N 19/127* | (2014.01) |
| *G06T 9/00* | (2006.01) |
| *H04N 19/115* | (2014.01) |
| *H04N 19/172* | (2014.01) |
| *H04N 19/597* | (2014.01) |
| *H04N 19/70* | (2014.01) |

(52) U.S. Cl.
CPC ............. *H04N 19/127* (2014.11); *G06T 9/00* (2013.01); *H04N 19/115* (2014.11); *H04N 19/172* (2014.11); *H04N 19/597* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2020/0014903 A1* | 1/2020 | Phillips | H04N 21/26258 |
| 2020/0351484 A1 | 11/2020 | Aflaki et al. | 13/161 |
| 2021/0250571 A1* | 8/2021 | Xu | H04N 21/21805 |
| 2021/0258590 A1* | 8/2021 | Boyce | H04N 19/182 |

FOREIGN PATENT DOCUMENTS

| | | |
|---|---|---|
| WO | 2020012071 A1 | 1/2020 |
| WO | 2021205068 A1 | 10/2021 |

OTHER PUBLICATIONS

"Information technology—Coded Representation of Immersive Media—Part 5: Visual Volumetric Video-based Coding (V3C) and Video-based Point Cloud Compression (V-PCC)" ISO/IEC 23090-5:2020(2E), ISO/IEC JTC 1/SC 29/WG 07, Nov. 2020, 365 pages.

* cited by examiner

*Primary Examiner* — Christopher Braniff
(74) *Attorney, Agent, or Firm* — Harrington & Smith

(57) ABSTRACT

An encoder may determine that volumetric video data comprises at least one time period during which a computational requirement for rendering or decoding changes at least a threshold amount; and include, in a bitstream, an indication of the change in the computational requirement for rendering or decoding of the volumetric video data during the at least one time period. A decoder may receive an indication of a change in at least one computational requirement for rendering or decoding of volumetric video data; and reallocate at least one computational resource based on the received indication.

20 Claims, 17 Drawing Sheets

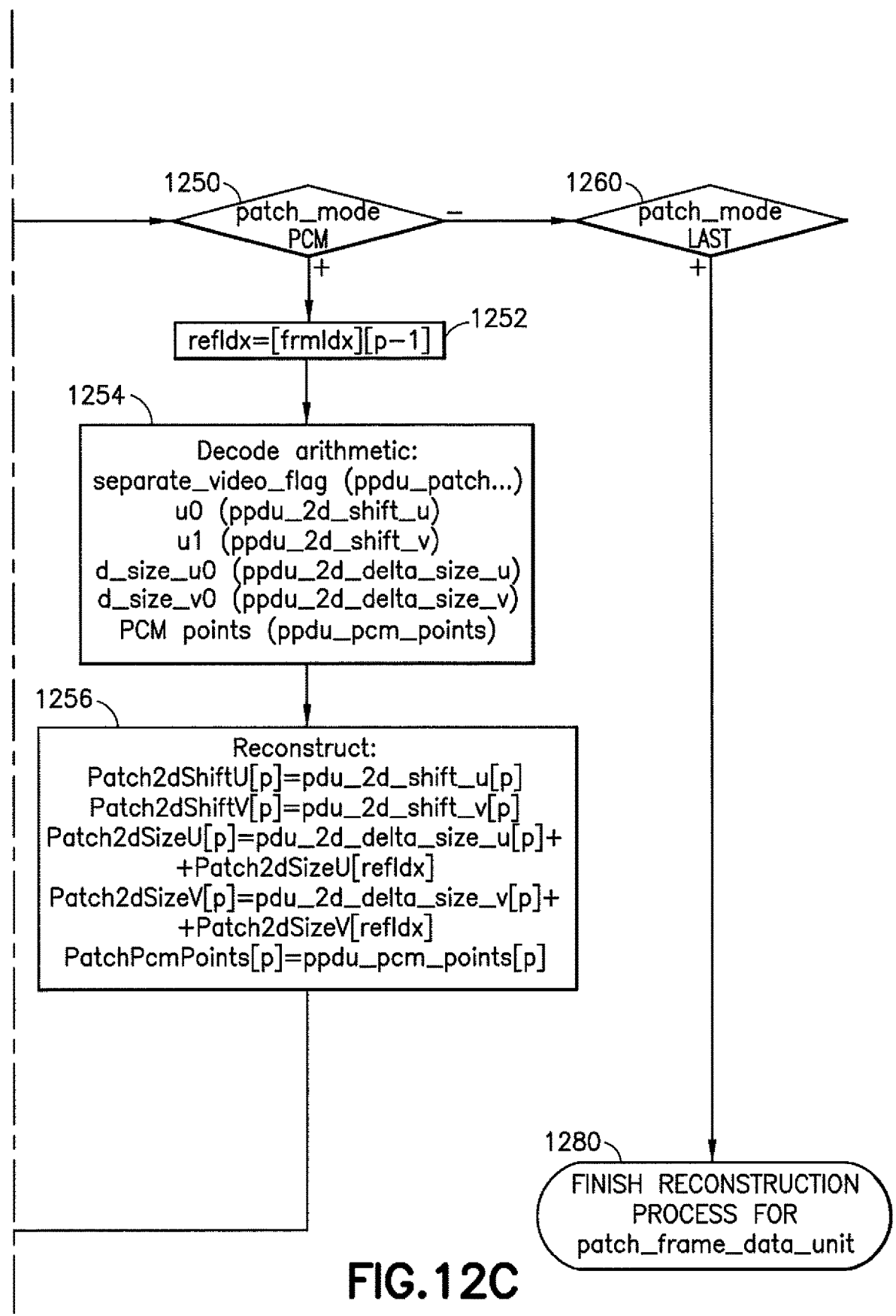

SIGNALING PROFILE LEVEL EXEMPTIONS
FOR IMMERSIVE VIDEO

PRIORITY BENEFIT

This application claims priority under 35 U.S.C. 119(e)(1) to U.S. Provisional Patent Application No. 63/125,086, filed Dec. 14, 2020, which is hereby incorporated by reference in its entirety.

TECHNICAL FIELD

The example and non-limiting embodiments relate generally to immersive video and specifically to signaling characteristics of immersive video for recreation of immersive video at a decoder side.

BACKGROUND

It is known, in video encoding, to project volumetric video data onto geometries and use 2D compression techniques to compress unfolded 2D planes of the geometries.

SUMMARY

The following summary is merely intended to be illustrative. The summary is not intended to limit the scope of the claims.

In accordance with one aspect, a method comprising: determining that volumetric video data comprises at least one time period during which a computational requirement for rendering or decoding changes at least a threshold amount; and including, in a bitstream, an indication of the change in the computational requirement for rendering or decoding of the volumetric video data during the at least one time period.

In accordance with one aspect, an apparatus comprising: at least one processor; and at least one non-transitory memory and computer program code, wherein the at least one memory and the computer program code are configured to, with the at least one processor, cause the apparatus to: determine that volumetric video data comprises at least one time period during which a computational requirement for rendering or decoding changes at least a threshold amount; and include, in a bitstream, an indication of the change in the computational requirement for rendering or decoding of the volumetric video data during the at least one time period.

In accordance with one aspect, an apparatus comprising means for performing: determining that volumetric video data comprises at least one time period during which a computational requirement for rendering or decoding changes at least a threshold amount; and including, in a bitstream, an indication of the change in the computational requirement for rendering or decoding of the volumetric video data during the at least one time period.

In accordance with one aspect, a non-transitory computer-readable medium comprising program instructions stored thereon which, when executed with at least one processor, cause the at least one processor to: determine that volumetric video data comprises at least one time period during which a computational requirement for rendering or decoding changes at least a threshold amount; and include, in a bitstream, an indication of the change in the computational requirement for rendering or decoding of the volumetric video data during the at least one time period.

In accordance with one aspect, a method comprising: receiving an indication of a change in at least one computational requirement for rendering or decoding of volumetric video data; and reallocating at least one computational resource based on the received indication.

In accordance with one aspect, an apparatus comprising: at least one processor; and at least one memory and computer program code, wherein the at least one memory and the computer program code are configured to, with the at least one processor, cause the apparatus to: receive an indication of a change in at least one computational requirement for rendering or decoding of volumetric video data; and reallocate at least one computational resource based on the received indication.

In accordance with one aspect, an apparatus comprising means for performing: receiving an indication of a change in at least one computational requirement for rendering or decoding of volumetric video data; and reallocating at least one computational resource based on the received indication.

In accordance with one aspect, a non-transitory computer-readable medium comprising program instructions stored thereon which, when executed with at least one processor, cause the at least one processor to: receive an indication of a change in at least one computational requirement for rendering or decoding of volumetric video data; and reallocate at least one computational resource based on the received indication.

BRIEF DESCRIPTION OF THE DRAWINGS

The foregoing aspects and other features are explained in the following description, taken in connection with the accompanying drawings, wherein:

FIGS. 12A, 12B, and 12C are a flowchart illustrating steps of an example decoding process as described herein;

DETAILED DESCRIPTION OF EMBODIMENTS

Figure 1:
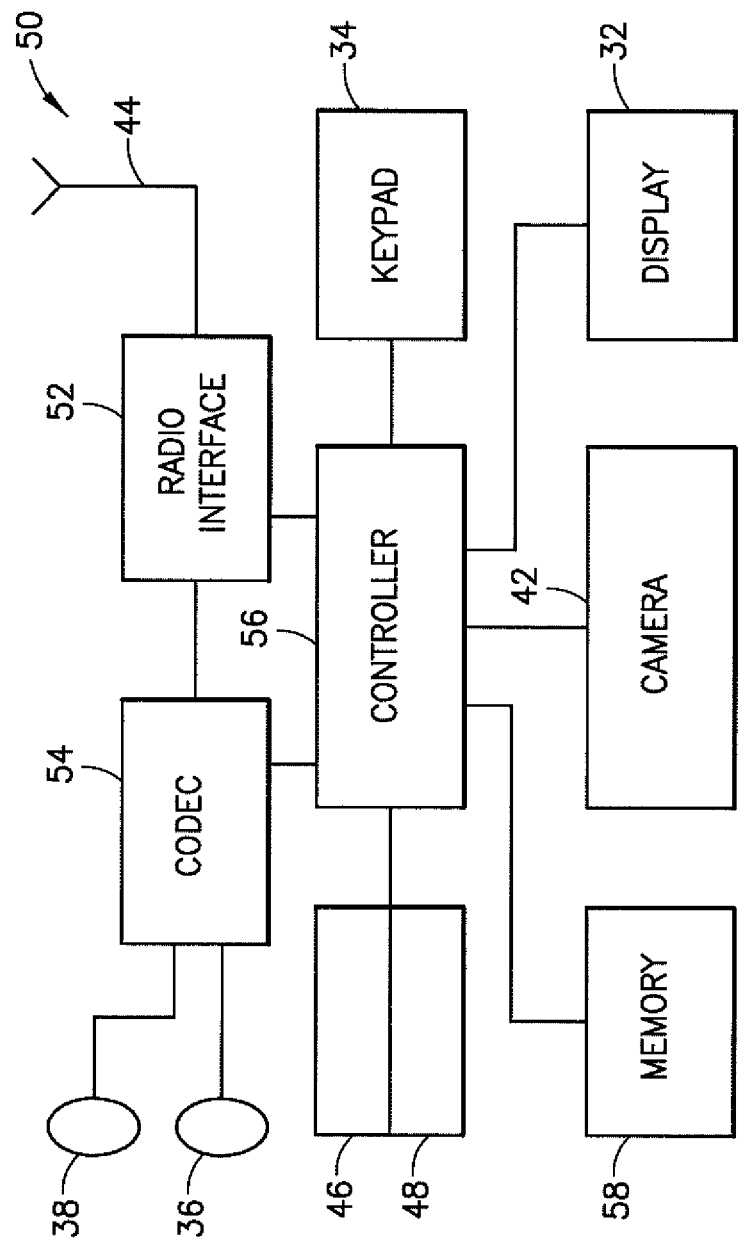
FIG. 1 is a block diagram of one possible and non-limiting exemplary system in which the exemplary embodiments may be practiced.

The following abbreviations that may be found in the specification and/or the drawing figures are defined as follows:

- 3GPP third generation partnership project
- 4G fourth generation
- 5G fifth generation
- 5GC 5G core network
- 6DoF six degrees of freedom
- AFOC atlas frame order count
- ALU arithmetic logic unit
- AR augmented reality
- ASPS atlas sequence parameter set
- BDTF bidirectional optical transfer function
- CDMA code division multiple access
- CGI computer-generated imagery
- CPU central processing unit
- CSG constructive solid geometry
- DSP digital signal processor
- eNB (or eNodeB) evolved Node B (e.g., an LTE base station)
- E-UTRA evolved universal terrestrial radio access, i.e., the LTE radio access technology
- FDMA frequency division multiple access
- FLOPS floating point operations per second
- gNB (or gNodeB) base station for 5G/NR, i.e., a node providing NR user plane and control plane protocol terminations towards the UE, and connected via the NG interface to the 5GC
- GPU graphical processing unit
- GSM global system for mobile communication
- HMD head mounted display
- IEEE Institute of Electrical and Electronics Engineers
- IMD integrated messaging device
- IMS instant messaging service
- IoT Internet-of-Things
- IRAP intra random access point
- LTE long term evolution
- LUT look-up table
- MIV MPEG immersive video
- MMS multimedia messaging service
- MPEG Moving Picture Experts Group
- MPEG-I Moving Picture Experts Group—immersive codec family
- MR mixed reality
- NAL network abstraction layer
- NR new radio
- PDA personal digital assistant
- pcc point cloud compression
- POC picture order count
- RBSP raw byte sequence payload
- SEI supplemental enhancement information
- SMS short message service
- SPS sequence parameter set
- TCP-IP transmission control protocol-internet protocol
- TDMA time division multiple access
- TDP thermal design power
- TM test model
- TMC2 test model category 2
- UE user equipment (e.g., a wireless, typically mobile device)
- UICC universal integrated circuit card
- UMTS universal mobile telecommunications service
- V3C visual volumetric video-based coding
- VCCC viewing space creation CPU class
- VCDC viewing space creation device class
- VCGC viewing space creation GPU class
- VHM viewing space handing method
- V-PCC video-based point cloud compression
- VPS V3C parameter set
- VR virtual reality
- WLAN wireless local area network The following describes suitable apparatus and possible mechanisms for practicing example embodiments of the present disclosure. Accordingly, reference is first made to FIG. 1, which shows an example block diagram of an apparatus 50. The apparatus may be configured to perform various functions such as, for example, gathering information by one or more sensors, encoding and/or decoding information, receiving and/or transmitting information, analyzing information gathered or received by the apparatus, or the like. A device configured to encode a video scene may (optionally) comprise one or more microphones for capturing the scene and/or one or more sensors, such as cameras, for capturing information about the physical environment in which the scene is captured. Alternatively, a device configured to encode a video scene may be configured to receive information about an environment in which a scene is captured and/or a simulated environment. A device configured to decode and/or render the video scene may be configured to receive a Moving Picture Experts Group immersive codec family (MPEG-I) bitstream comprising the encoded video scene. A device configured to decode and/or render the video scene may comprise one or more speakers/audio transducers and/or displays, and/or may be configured to transmit a decoded scene or signals to a device comprising one or more speakers/audio transducers and/or displays. A device configured to decode and/or render the video scene may comprise a user equipment, a head/mounted display, or another device capable of rendering to a user an AR, VR and/or MR experience.

The electronic device 50 may for example be a mobile terminal or user equipment of a wireless communication system. Alternatively, the electronic device may be a computer or part of a computer that is not mobile. It should be appreciated that embodiments of the invention may be implemented within any electronic device or apparatus which may process data. The electronic device 50 may comprise a device that can access a network and/or cloud through a wired or wireless connection. The electronic device 50 may comprise one or more processors or controllers 56, one or more memories 58, and one or more transceivers 52 interconnected through one or more buses. The one or more processors 56 may comprise a central processing unit (CPU) and/or a graphical processing unit (GPU). Each of the one or more transceivers 52 includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers may be connected to one or more antennas 44. The one or more memories 58 may include computer program code. The one or more memories 58 and the computer program code may be configured to, with the one or more processors 56, cause the electronic device 50 to perform one or more of the operations as described herein.

The electronic device 50 may connect to a node of a network. The network node may comprise one or more processors, one or more memories, and one or more transceivers interconnected through one or more buses. Each of the one or more transceivers includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers may be connected to one or more antennas. The one or more memories may include computer program code. The one or more memories and the computer program code may be configured to, with the one or more processors, cause the network node to perform one or more of the operations as described herein.

The electronic device 50 may comprise a microphone 36 or any suitable audio input which may be a digital or analogue signal input. The electronic device 50 may further comprise an audio output device which in embodiments of the invention may be any one of: an earpiece 38, speaker, or an analogue audio or digital audio output connection. The electronic device 50 may also comprise a battery (or in other embodiments of the invention the device may be powered by any suitable mobile energy device such as solar cell, fuel cell or clockwork generator). The electronic device 50 may further comprise a camera 42 capable of recording or capturing images and/or video. The electronic device 50 may further comprise a display 32. The electronic device 50 may further comprise an infrared port for short range line of sight communication to other devices. In other embodiments the apparatus 50 may further comprise any suitable short-range communication solution such as for example a Bluetooth™ wireless connection or a USB/firewire wired connection.

It should be understood that an electronic device 50 configured to perform example embodiments of the present disclosure may have fewer and/or additional components, which may correspond to the processes the electronic device 50 is configured to perform. For example, an apparatus configured to encode a video might not comprise a speaker or audio transducer and may comprise a microphone, while an apparatus configured to render the decoded video might not comprise a microphone and may comprise a speaker or audio transducer.

Referring now to FIG. 1, the electronic device 50 may comprise a controller 56, processor or processor circuitry for controlling the apparatus 50. The controller 56 may be connected to memory 58, which in embodiments of the invention may store both data in the form of image and audio data and/or may also store instructions for implementation on the controller 56. The controller 56 may further be connected to codec circuitry 54 suitable for carrying out coding and/or decoding of audio and/or video/image data or assisting in coding and/or decoding carried out by the controller.

The electronic device 50 may further comprise a card reader 48 and a smart card 46, for example a UICC and UICC reader for providing user information and being suitable for providing authentication information for authentication and authorization of the user at a network. The electronic device 50 may further comprise an input device 34, such as a keypad, one or more input buttons, or a touch screen input device, for providing information to the controller 56.

The electronic device 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The electronic device 50 may comprise a microphone 38, camera 42, and/or other sensors capable of recording or detecting audio signals, image/video signals, and/or other information about the local/virtual environment, which are then passed to the codec 54 and/or the controller 56 for processing. The electronic device 50 may receive the audio/image/video signals and/or information about the local/virtual environment for processing from another device prior to transmission and/or storage. The electronic device 50 may also receive either wirelessly or by a wired connection the audio/image/video signals and/or information about the local/virtual environment for encoding/decoding. The structural elements of electronic device 50 described above represent examples of means for performing a corresponding function.

The memory 58 may be of any type suitable to the local technical environment and may be implemented using any suitable data storage technology, such as semiconductor-based memory devices, flash memory, magnetic memory devices and systems, optical memory devices and systems, fixed memory and removable memory. The memory 58 may be a non-transitory memory. The memory 58 may be means for performing storage functions. The controller 56 may be or comprise one or more processors, which may be of any type suitable to the local technical environment, and may include one or more of general-purpose computers, special purpose computers, microprocessors, digital signal processors (DSPs) and processors based on a multi-core processor architecture, as non-limiting examples. The controller 56 may be means for performing functions.

Figure 2:
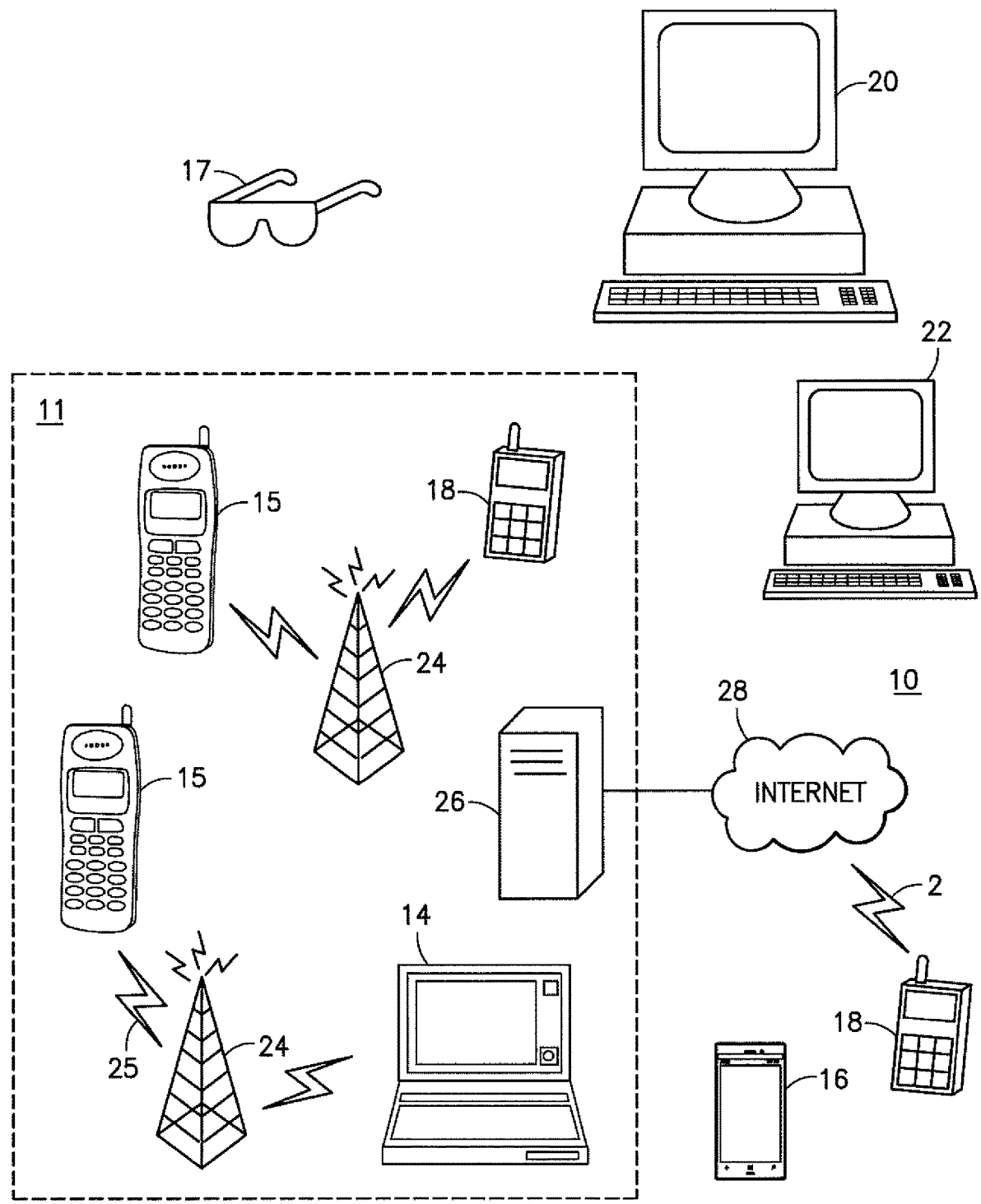
FIG. 2 is a block diagram of one possible and non-limiting exemplary system in which the exemplary embodiments may be practiced.

With respect to FIG. 2, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, E-UTRA, LTE, CDMA, 4G, 5G network etc.), a wireless local area network (WLAN) such as defined by any of the IEEE 802.x standards, a Bluetooth personal area network, an Ethernet local area network, a token ring local area network, a wide area network, and/or the Internet.

The system 10 may include both wired and wireless communication devices and/or electronic devices suitable for implementing embodiments of the invention.

For example, the non-limiting example system shown in FIG. 2 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an apparatus 15, a combination of a personal digital assistant (PDA) and a mobile telephone 14, a PDA 16, an integrated messaging device (IMD) 18, a desktop computer 20, a notebook computer 22, and a head-mounted display (HMD) 17. The electronic device 50 may comprise any of those example communication devices. In an example embodiment of the present disclosure, more than one of these devices, or a plurality of one or more of these devices, may perform the disclosed process(es). These devices may connect to the internet 28 through a wireless connection 2.

The embodiments may also be implemented in a set-top box; i.e. a digital TV receiver, which may or may not have a display or wireless capabilities, in tablets or (laptop) personal computers (PC), which have hardware and/or software to process neural network data, in various operating systems, and in chipsets, processors, DSPs and/or embedded systems offering hardware/software based coding. The embodiments may also be implemented in cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Some or further apparatus may send and receive calls and messages and communicate with service providers through a wireless connection 25 to a base station 24, which may be, for example, an eNB, gNB, etc. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, which may be a MPEG-I bitstream, from one or several senders (or transmitters) to one or several receivers.

Features as described herein generally relate to enablement of virtual reality (VR), augmented reality (AR), and/or mixed reality (MR). It should be understood that example embodiments described with regard to one of VR, AR, or MR may be implemented with respect to any of these technology areas. Virtual reality (VR) is an area of technology in which video content may be provided, e.g. streamed, to a VR display system. The VR display system may be provided with a live or stored feed from a video content source, the feed representing a VR space or world for immersive output through the display system. A virtual space or virtual world is any computer-generated version of a space, including but not limited to a captured real-world space, in which a user can be immersed through a display system such as a VR headset. A VR headset may be configured to provide VR video and audio content to the user, e.g. through the use of a pair of video screens and headphones incorporated within the headset. Augmented reality (AR) is similar to VR in that video content may be provided, as above, which may be overlaid over or combined with aspects of a real-world environment in which the AR content is being consumed. A user of AR content may therefore experience a version of the real-world environment that is "augmented" with additional virtual features, such as virtual visual and/or audio objects. A device may provide AR video and audio content overlaid over a visible or recorded version of the real-world visual and audio elements.

Features as described herein may relate to methods of encoding, decoding, and/or rendering AR/VR/MR content, including but not limited to volumetric/immersive video data. The encoding, decoding, and/or rendering of the content may take place at a single device or at two or more separate devices. For example, the encoding of the content may take place at a user equipment, a server, or another electronic device capable of performing the processes herein described. The encoded content may then be transmitted to another device, which may then store, decode, and/or render the content. Transmission of the encoded content may, for example, occur over a network connection, such as an LTE, 5G, and/or NR network. As another example, the encoding of the content may take place at a server. The encoded content may then be stored on a suitable file server, which may then be transmitted to another device, which may then store, decode, and/or render the content.

Features as described herein may relate to volumetric video data. Volumetric video data may represent a three-dimensional scene or object and may be used as input for AR, VR, and MR applications. Because volumetric video describes a 3D scene (or object), such data can be viewed from any viewpoint. Therefore, volumetric video is an important format for AR, VR, or MR applications, especially for providing six degrees of freedom (6DoF) viewing capabilities. Such data may describe geometry (shape, size, position in 3D-space, etc.) and respective attributes (e.g. color, opacity, reflectance, etc.), plus any possible temporal changes of the geometry and attributes at given time instances. Temporal information about the scene may be included in the form of individual capture instances, i.e. "frames" in 2D video, or other means, e.g. position of an object as a function of time.

Volumetric video may be generated from 3D models, i.e. computer-generated imagery (CGI); captured from real-world scenes using a variety of capture solutions, e.g. multi-camera, laser scan, combination of video and dedicated depth sensors, etc.; or generated from a combination of generated data and real-world data. Increasing computational resources and advances in 3D data acquisition devices has enabled reconstruction of highly detailed volumetric video representations of natural scenes. Representation of the 3D data depends on how the 3D data is used. Infrared, lasers, time-of-flight, and structured light are all examples of devices that can be used to construct 3D video data. Typical representation formats for such volumetric data are triangle meshes, point clouds, voxels, etc. Dense voxel arrays have been used to represent volumetric medical data. In 3D graphics, polygonal meshes are extensively used. Point clouds are well suited for applications such as capturing real world 3D scenes where the topology is not necessarily a 2D manifold. Another way to represent 3D data is coding this 3D data as a set of texture and depth maps, as is the case in the multi-view plus depth. Closely related to the techniques used in multi-view plus depth is the use of elevation maps, and multi-level surface maps.

In dense point clouds or voxel arrays, the reconstructed 3D scene may contain tens or even hundreds of millions of points. If such representations are to be stored or interchanged between entities, then efficient compression becomes essential. Standard volumetric video representation formats, such as point clouds, meshes, voxels, etc. suffer from poor temporal compression performance. Identifying correspondences for motion-compensation in 3D-space is an ill-defined problem, as both geometry and respective attributes may change. For example, successive temporal "frames" do not necessarily have the same number of meshes, points, or voxels. Therefore, compression of dynamic 3D scenes may be inefficient. 2D-video based approaches for compressing volumetric data, i.e. multiview+ depth, have much better compression efficiency, but rarely cover the full scene. Therefore, they may provide only limited 6DoF capabilities.

Instead of the above-mentioned 2D approach, a 3D scene, represented as meshes, points, and/or voxels, may be projected onto one or more geometries. These geometries may be "unfolded" into 2D planes (i.e. two planes per geometry: one for texture, one for depth), which are then encoded using standard 2D video compression technologies. Relevant projection geometry information is transmitted alongside the encoded video files to the decoder. The decoder decodes the video and performs the inverse projection to regenerate the 3D scene in any desired representation format (which might not necessarily be the starting format).

Projecting volumetric models onto 2D planes allows for using standard 2D video coding tools with highly efficient temporal compression. Thus, coding efficiency may be greatly increased. Using geometry-projections instead of prior-art 2D-video based approaches, i.e. multiview+depth, may provide better coverage of a 3D scene or object. Thus, 6DoF capabilities may be improved. Using several geometries for individual objects may further improve the coverage of a scene. Furthermore, standard video encoding hardware may be utilized for real-time compression/decompression of the projected planes. The projection and reverse projection steps are of low complexity.

Figure 3:
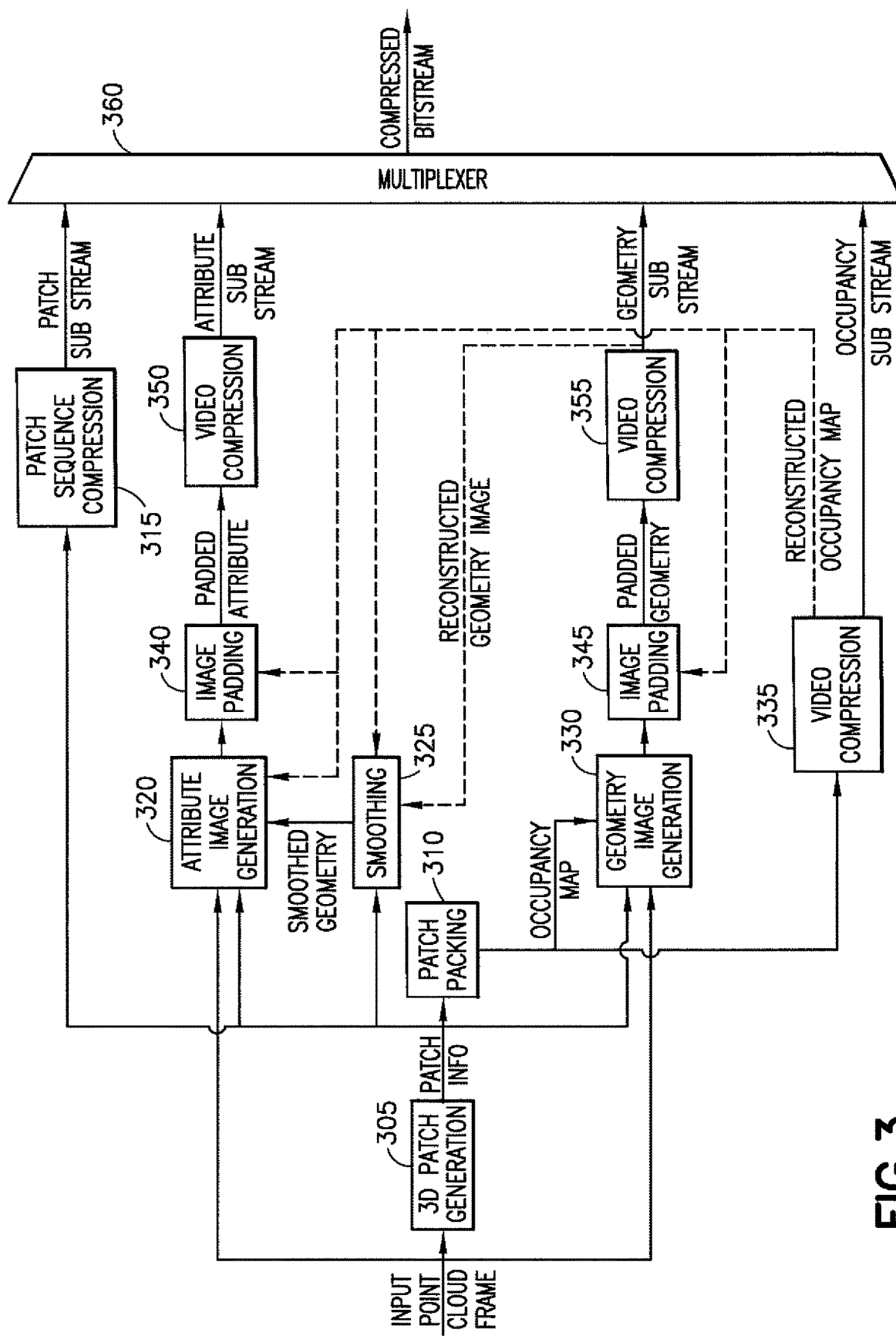
FIG. 3 is a diagram illustrating features of an example compression process as described herein.

Referring now to FIG. 3, illustrated is an overview of the video-based point cloud compression (V-PCC) process implemented in V-PCC TMC2. V-PCC compression and decompression are further described in MPEG N19092. V-FCC compression may take place during the encoding stage. In the example of FIG. 3, a point cloud frame may be processed. The volumetric data may be represented as a set of 3D projections in different components; in other words, the input point cloud data/frame may be projected onto one or more geometries. At 305, the input point cloud frame may be used to generate one or more 3D patches. For example, the 3D image may be decomposed into far and near components for geometry and corresponding attribute components. The 2D projection may be composed of independent patches based on geometry characteristics of the input point cloud frame. The patch information and the input point cloud frame may be used to generate one or more attribute images describing the attributes associated with the patches, at 320. The patch information may be used to perform patch packing, at 310. For example, an occupancy map 2D image may be created to indicate parts of an image that may be used. The input point cloud frame, the patch information, and the occupancy map produced via the patch packing process may be used to generate one or more geometry images describing the patches, at 330.

The packed patches/occupancy map may be compressed at 335, resulting in an occupancy sub-stream sent to the multiplexer 360. Image padding may be applied to the one or more geometry images at 345, and the padded geometry images may be compressed at 355, resulting in a geometry sub-stream sent to the multiplexer 360. The image padding may be based on an occupancy map reconstructed from the compressed patches, at 345. Smoothing of the attribute image may be based on a geometry image reconstructed from the compressed geometry image and an occupancy map reconstructed from the compressed patches/occupancy map, at 325. In an example, the reconstructed geometry information may be smoothed outside the encoding loop as a post processing step. Additional smoothing parameters that were used for the smoothing process may be transferred as a supplemental information for the decoding process. The generation of the attribute image may be based on the smoothed geometry and an occupancy map reconstructed from the compressed patches/occupancy map, at 320. Image padding may be applied to the one or more attribute images at 340, and the padded attribute images may be compressed at 350, resulting in an attribute sub-stream sent to the multiplexer 360. The image padding may be based on an occupancy map reconstructed from the compressed patches/occupancy map, at 340. The sequence of the generated patches may be compressed at 315, resulting in a patch sub-stream sent to the multiplexer 360. This patch sub-stream may be considered as comprising compressed auxiliary information.

Figure 4:
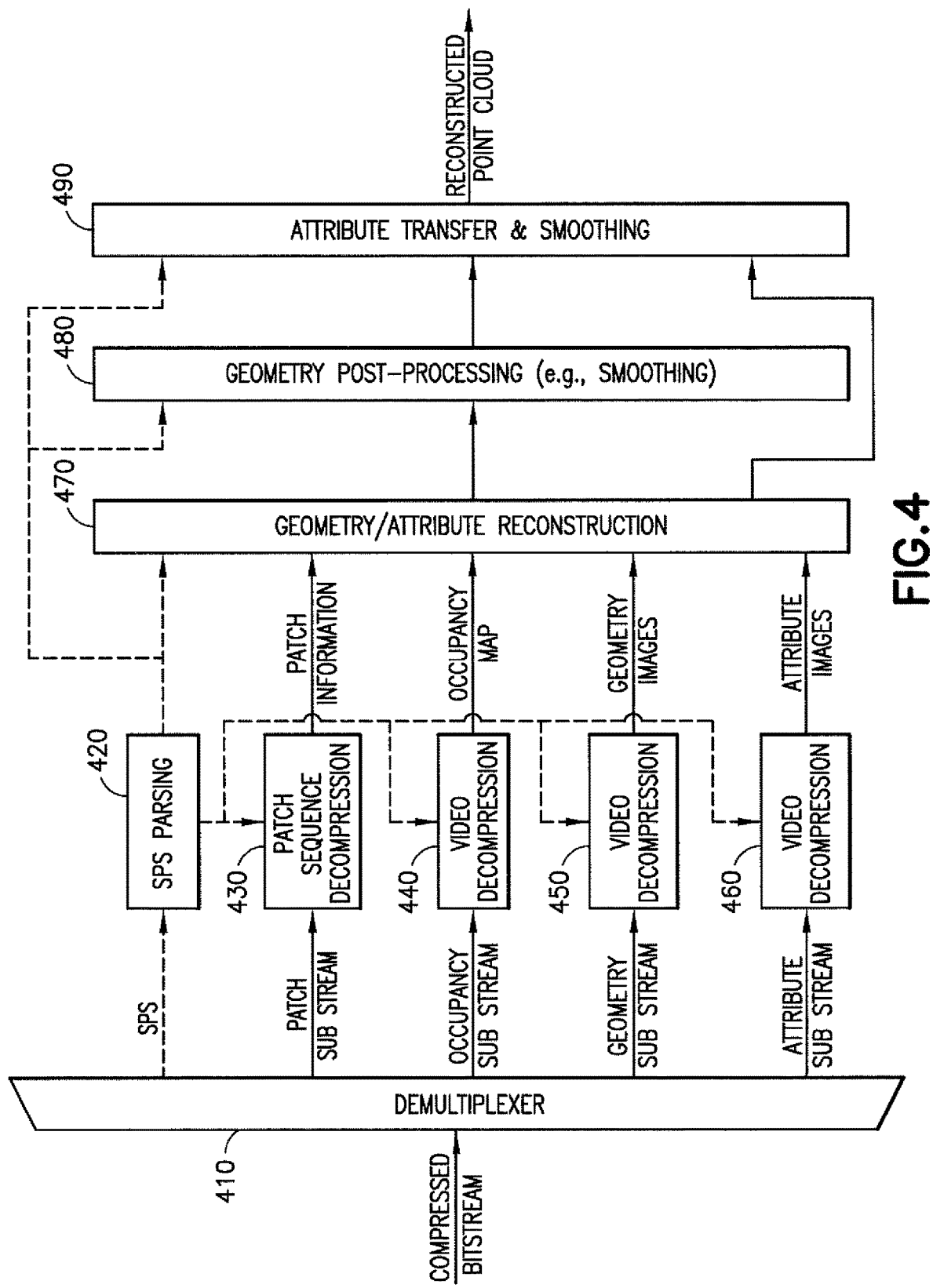
FIG. 4 is a diagram illustrating features of an example decompression process as described herein.

The multiplexer 360 may multiplex the patch sub-stream, the attribute sub-stream, the geometry sub-stream, and the occupancy sub-stream to produce a compressed bitstream that may be transmitted to a decoder, for example a decoder implementing the decompression process illustrated at FIG. 4.

Referring now to FIG. 4, illustrated is an overview of the V-PCC decompression process. A compressed bitstream may be received by the demultiplexer 410. The demultiplexer 410 may demultiplex the compressed bitstream into a sequence parameter set (SPS) sub-stream, a patch sub-stream, an occupancy sub-stream, a geometry sub-stream, and an attribute sub-stream. The SPS sub-stream may be parsed at 420. The SPS sub-stream may be considered auxiliary information, which may have been entropy coded. The patch sequence sub-stream may be decompressed at 430, resulting in patch information. The decompression of the patch sequence sub-stream may be based, at least partially, on auxiliary information, e.g. from 420. The occupancy sub-stream may be decompressed at 440, resulting in an occupancy map. The occupancy map may have been compressed using video compression, and may have to be upscaled to the nominal resolution. The nearest neighbor method may be applied for upscaling. The decompression of the occupancy sub-stream may be based, at least partially, on auxiliary information, e.g. from 420. The geometry sub-stream may be decompressed at 450, resulting in one or more geometry images. The decompression of the geometry sub-stream may be based, at least partially, on auxiliary information, e.g. from 420. The attribute sub-stream may be decompressed at 460, resulting in one or more attribute images. The decompression of the attribute sub-stream may be based, at least partially, on auxiliary information, e.g. from 420. Based on the auxiliary information, patch information, occupancy map, geometry images, and attribute images, the geometry and attributes may be reconstructed, at 470. Geometry post-processing, such as smoothing, may be applied to reconstruct point cloud geometry information, at 480. The geometry post-processing may be based, at least partially, on auxiliary information, e.g. from 420.

The attributes of the point cloud may be reconstructed, at 470, based on the decoded attribute video stream and reconstructed information for smoothed geometry and, if present, occupancy map and auxiliary information. After the attribute reconstruction stage, an additional attribute smoothing method may be used for point cloud refinement, at 490. The attribute transfer and smoothing may be based, at least partially, on auxiliary information and/or reconstructed geometry/attributes.

Figure 5:
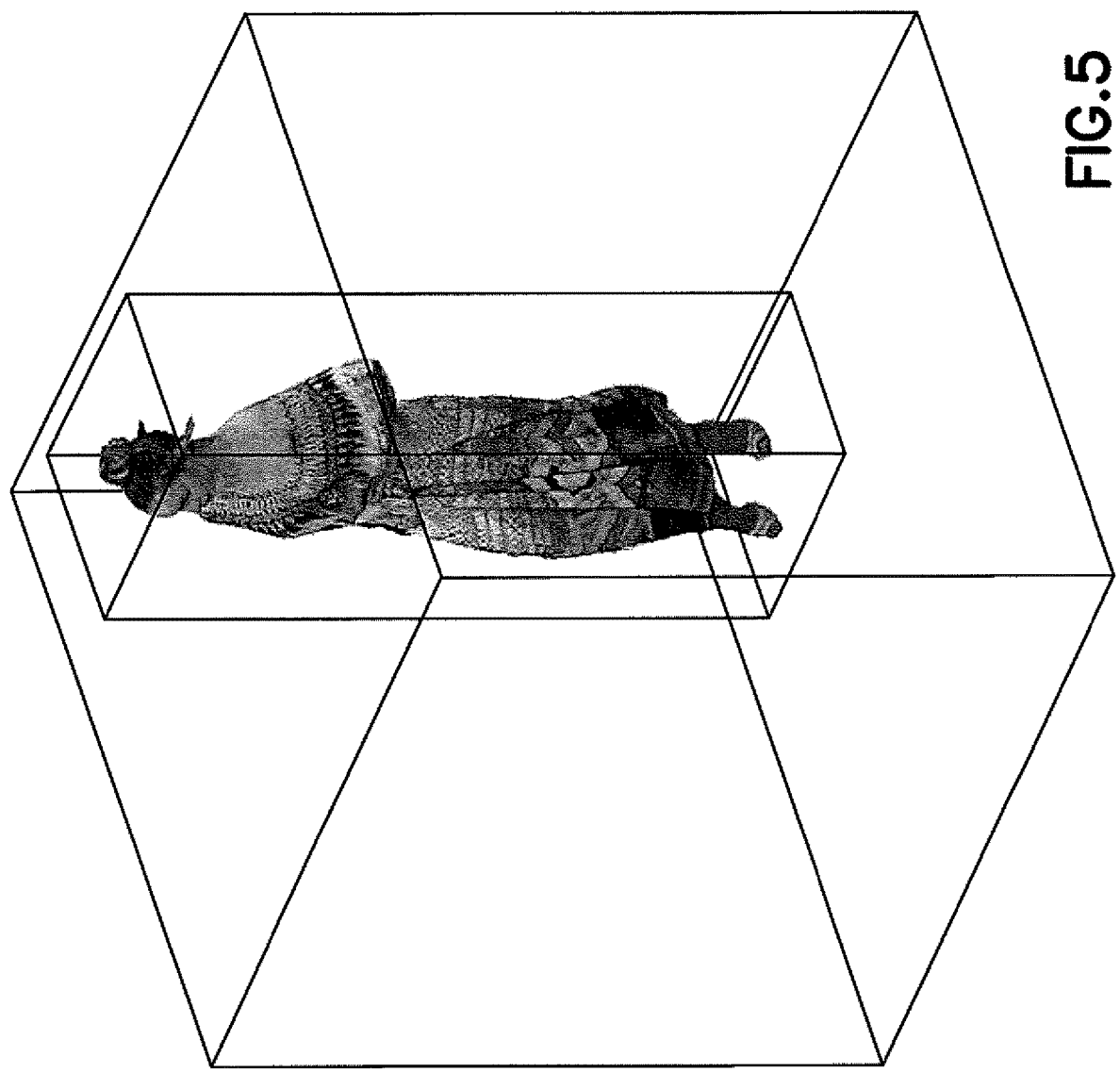
FIG. 5 is a diagram illustrating features of an example point cloud frame as described herein.
Figure 6A:
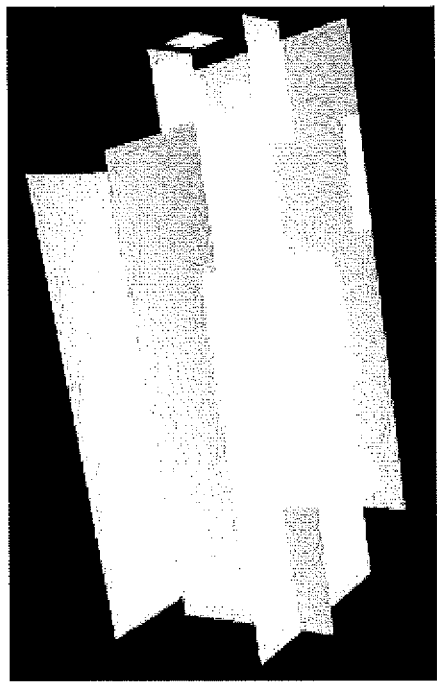
FIG. 6A is a diagram illustrating features of an example reconstruction process as described herein.
Figure 6B:
FIG. 6B is a diagram illustrating features of an example reconstruction process as described herein.
Figure 6C:
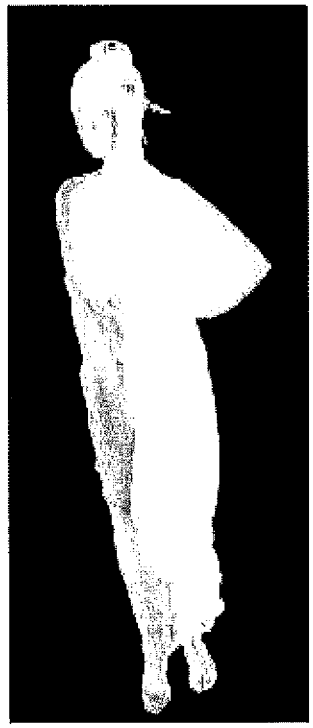
FIG. 6C is a diagram illustrating features of an example reconstruction process as described herein.
Figure 6D:
FIG. 6D is a diagram illustrating features of an example reconstruction process as described herein.

Referring now to FIG. 5, illustrated is an example of a point cloud frame that may be used in V-PCC. A point cloud frame may represent a dataset of points within a 3D volumetric space that have unique coordinates and attributes, at a point in time or as a function of time. Referring now to FIGS. 6A-D, illustrated is a reconstruction process for the point cloud frame, which may have been compressed using, for example, the process of FIG. 3 and decompressed using, for example, the process of FIG. 4. FIG. 6A illustrates a reconstruction of FIG. 5 using atlas information. FIG. 6B illustrates a reconstruction of FIG. 5 using atlas information and an occupancy map. FIG. 6C illustrates a reconstruction of FIG. 5 using atlas information, an occupancy map, and geometries. FIG. 6D illustrates a reconstruction of FIG. using atlas information, an occupancy map, geometries, and attributes. It may be understood that each of the sub-streams included in the compressed bitstream includes information that may be used to reconstruct a point cloud frame.

Figure 7A:
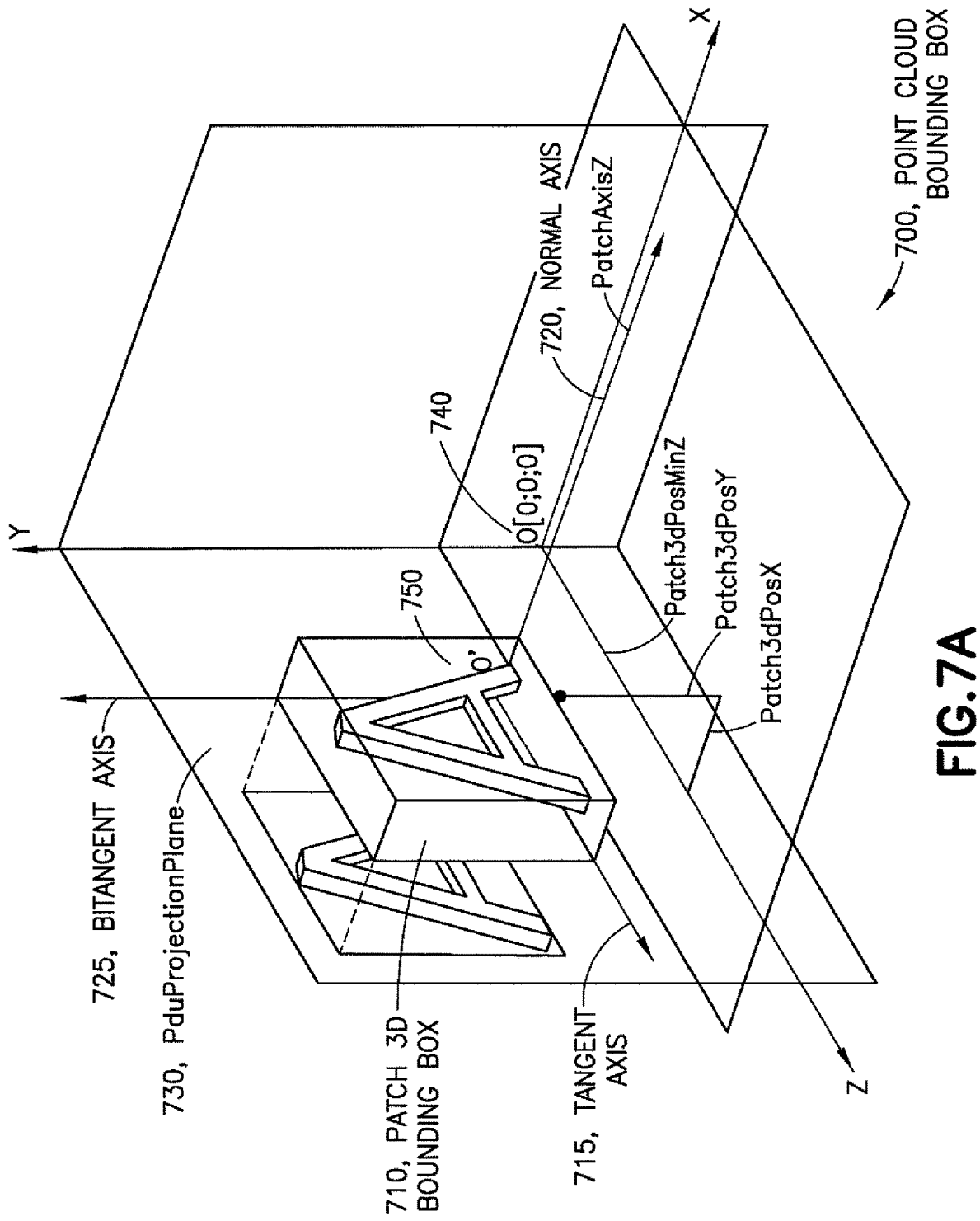
FIG. 7A is a diagram illustrating features of an example point cloud bounding box as described herein.
Figure 7B:
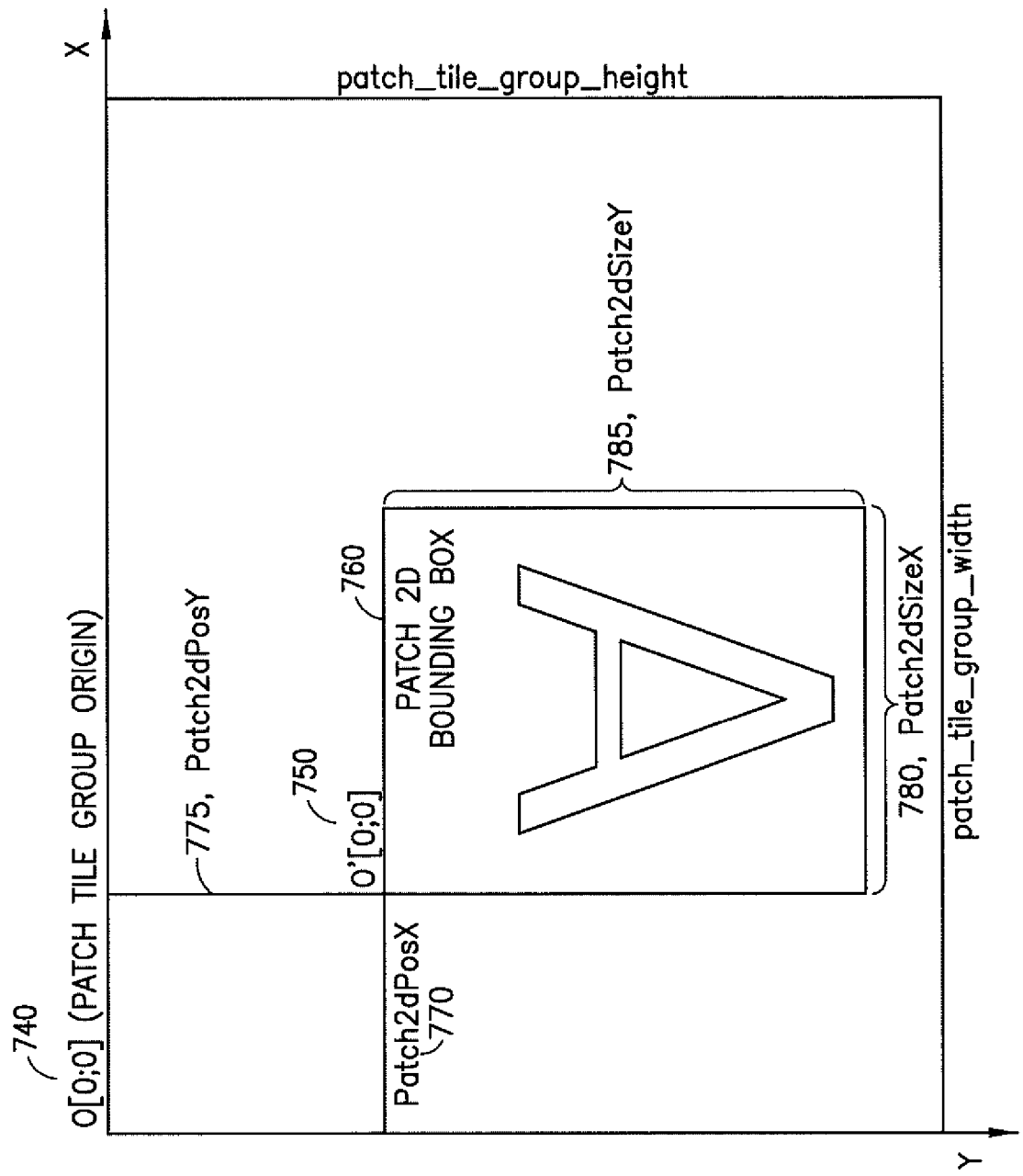
FIG. 7B is a diagram illustrating features of an example patch as described herein.

Referring now to FIGS. 7A-B, illustrated is a patch description and associated patch information for atlas data. In V-PCC notation, a patch is a collection of information that represents a 3D bounding box of a point cloud, and associated geometry and attribute description, along with the atlas information that is required to reconstruct the 3D point positions and their corresponding attributes from the 2D projections. In FIG. 7A, point cloud bounding box 700 may contain a patch 3D bounding box 710 surrounding/encasing a 3D object, A. The patch axis orientation (tangent axis (715), bitangent axis (725), normal axis (720)) may depend on the projection plane index (PduProjectionPlane (730)), and a patch projection mode. It should be noted that any side of the bounding box and additional 45 degree diagonal projections may be a projection plane. The origin of the patch bounding box may be the nearest vertex to the point cloud coordinates, origin point O[0; 0; 0] (740). The projection image may be divided into tile groups. The origin point of the patch projection may be the nearest point to the patch tile group origin point O[0; 0; 0] (740), i.e. O' (750).

The patch information may be generated per each point cloud frame unless the information is considered static. In the example of FIGS. 7A-B, the atlas information may only be generated for the key (e.g. intra random reference point (IRAP)) point cloud compression (pcc) frames.

Referring now to FIG. 7B, illustrated is an example of a patch generated from the 3D point cloud frame illustrated in FIG. 7A. The patch may comprise a Patch 2D bounding box (760) that may be described by Patch2dSizeX (780) and Patch2dSizeY (785). The origin of the Patch 2D bounding box may be the origin point of the patch projection in FIG. 7A, O'[0; 0] (750). This origin may be described with reference to the patch tile group origin point O[0; 0] (740) with Patch2dPosX (770) and Patch2dPosY (775). The patch tile group origin may be described by patch_tile_group_width and patch_tile_group_height.

Figure 8:
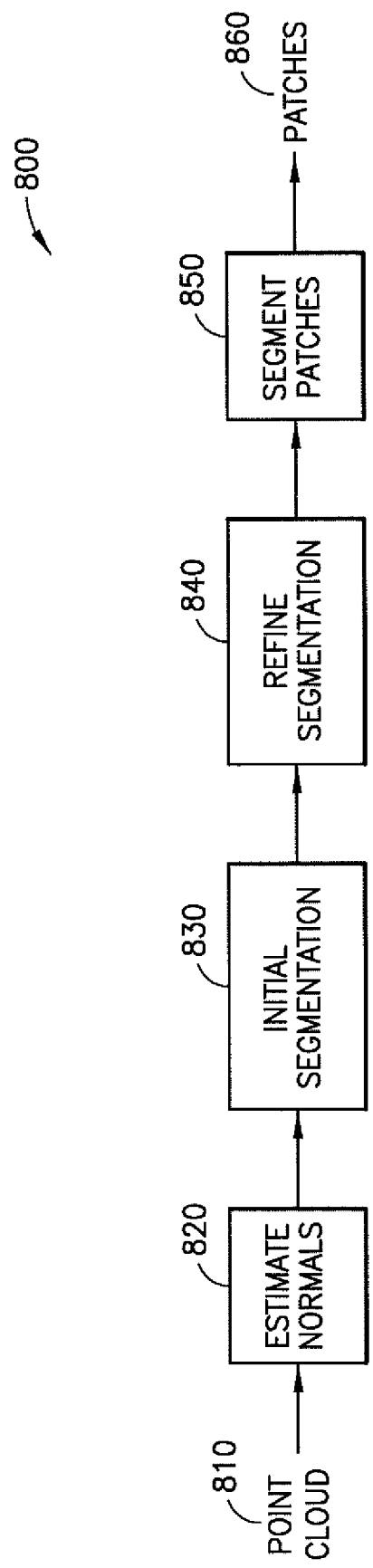
FIG. 8 is a diagram illustrating features of an example patch segmentation process as described herein.

Referring now to FIG. 8, illustrated is a patch segmentation process 800. This, or a similar process, may be used during 3D patch generation at, for example, 305 of FIG. 3. In the example of FIG. 8, a single point cloud frame may be used as input, 810. The patch segmentation/generation process 800 may comprise decomposing the point cloud frame 810 by converting 3D samples to 2D samples on a given projection plane using a strategy that provides the best compression. In TMC2v0, the patch generation process aims at decomposing the point cloud into a minimum number of patches with smooth boundaries, while also minimizing reconstruction error.

At 820, a normal may be estimated for each point. The tangent plane and its corresponding normal may be defined for each point based on the point's nearest neighbours m within a predefined search distance. At 830, initial segmentation, a K-D tree may be used to separate the data and find neighbours in the vicinity of a point $p_i$, and a barycenter c= $\overline{p}$ of that set of points may be used to define the normal. The barycenter c may be computed as follows:

$$c = \overline{p} = \frac{1}{m}\sum_{i=1}^{m} p_i$$

The normal may be estimated from eigen decomposition for the defined point cloud as:

$$\sum_{i=1}^{m} (p_1 - \overline{p})(p_i - \overline{p})^T$$

Based on this information, each point may be associated with a corresponding plane of a point cloud bounding box. Each plane may be defined by a corresponding normal $\vec{n}_{P_{idx}}$ with values:

(1.0, 0.0, 0.0),
(0.0, 1.0, 0.0),
(0.0, 0.0, 1.0),
(−1.0, 0.0, 0.0),
(0.0, −1.0, 0.0),
(0.0, 0.0, −1.0).

More precisely, each point may be associated with the plane that has the closest normal (i.e., maximizes the dot product of the point normal $\vec{n}_{P_i}$ and the plane normal $\vec{n}_{P_{idx}}$):

$$\max_{P_{idx}}\{\vec{n}_{P_i} \cdot \vec{n}_{P_{idx}}\}$$

The sign of the normal may be defined depending on the point's position in relation to the "center".

The initial clustering may then be refined by iteratively updating the clustered index associated with each point based on the point's normal and the cluster indices of the point's nearest neighbors, at 840 (i.e. refine segmentation).

At the following step, segment patches 850, the points may be clustered based on the closeness of the normals and the distance between points in Euclidian space. Final patches, 860, may be created from the clusters by grouping similar clusters. By adding the weight to each plane, the patches may be refined when the Initial Segmentation process, 830, decides the projection plane, in order to increase the size of the patch in the front or back. The weight values may be calculated in the first frame per GOF. The weight may be determined according to the ratio of projected points when projecting all points to the three planes (XY, YZ, ZX).

The refine segmentation process, 840, may provide a minimum number of connected components (patches) for a given number of points in the point cloud frame 810.

Figure 9:
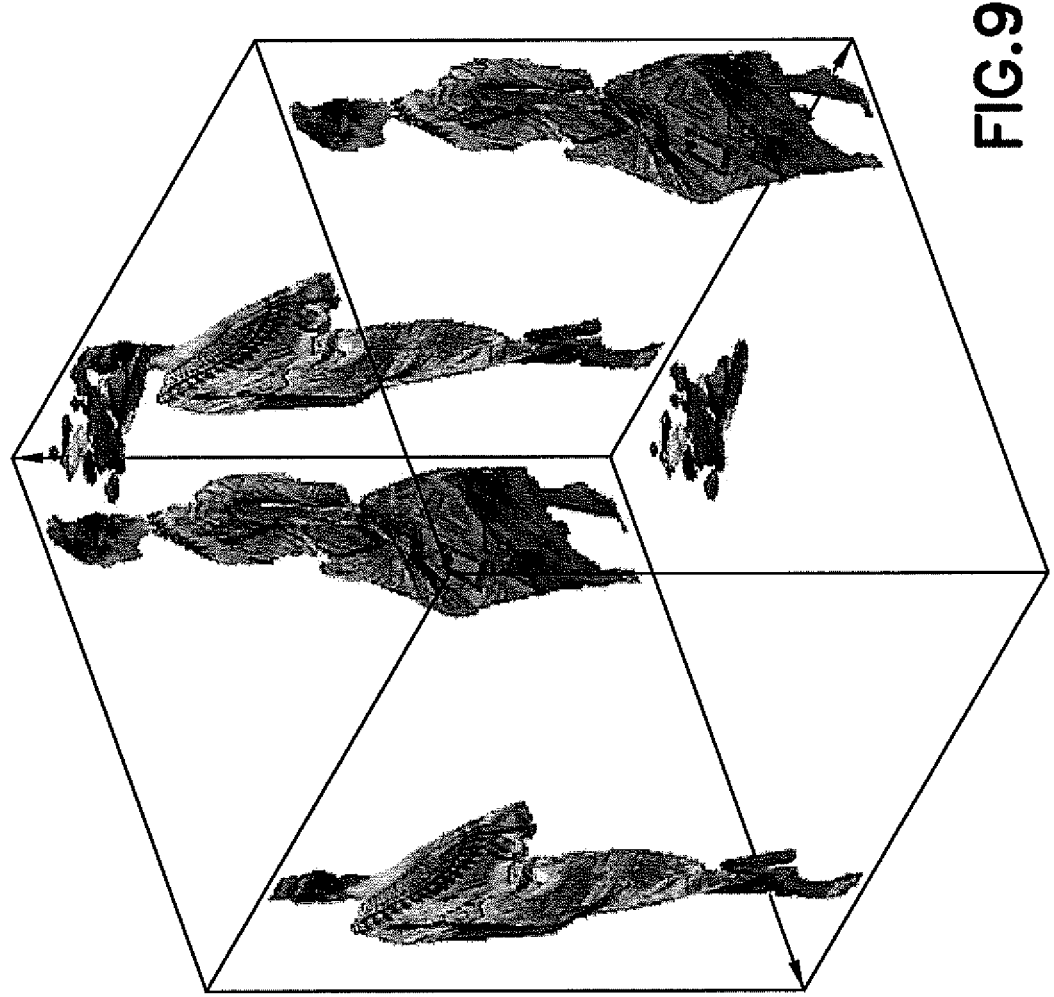
FIG. 9 is a diagram illustrating features of an example projection as described herein.

Referring now to FIG. 9, illustrated is a point cloud frame projected onto "bounded-box" planes. FIG. 9 may be considered the result of applying the patch segmentation process 800 of FIG. 8 to the example point cloud frame of FIG. 5, where segmented patches of the point cloud have been projected onto projection planes.

Figure 10:
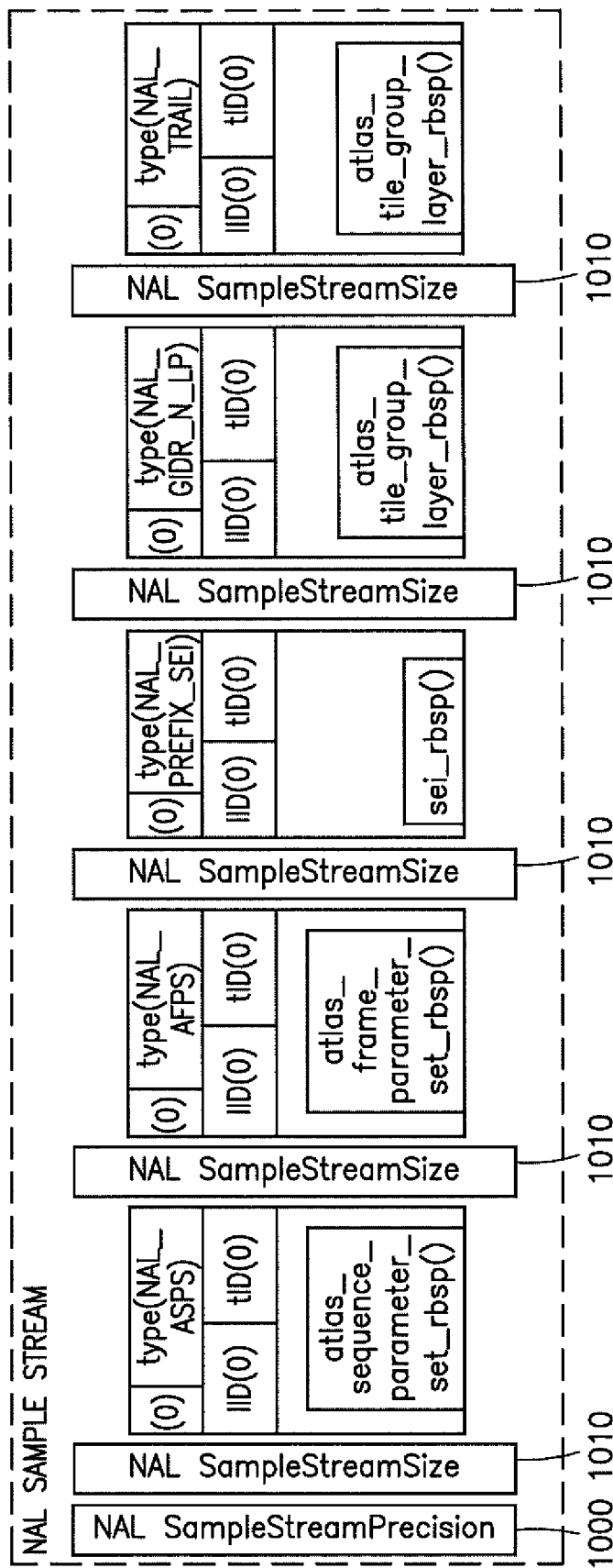
FIG. 10 is a diagram illustrating features of an example bitstream as described herein.

Referring now to FIG. 10, illustrated is an example network abstraction layer (NAL) sample bitstream. The NAL sample stream may be used for coded representation of dynamic point clouds. One of the advantages of the NAL concept is the use of different prediction structures and many other advanced techniques introduced in video encoding. The flexible coding structure may be implemented by using the picture order count (POC) concept, as well as a class to manage the list of parameters in the NAL sample stream and V-PCC sample stream.

FIG. 10 illustrates an example of a NAL bitstream with other types of NAL units. Generation of the V-PCC or NAL unit sample stream format may start with a sample stream header, 1000, followed by a sequence of sample stream V-PCC unit or NAL unit syntax structures. The sample stream V-PCC or NAL header 1000 may contain a syntax element, "ssvh_unit_size_precision_bytes_minus1" or "ssnh_unit_size_precision_bytes_minus1", which may be used to specify the precision (e.g. NAL SampleStreamPrecision), in bytes, of the "ssvu_vpcc_unit_size" or "ssnu_nal_unit_size" syntax element (e.g. NAL SampleStreamSize), 1010, in each sample stream V-PCC or NAL units. The "ssvu_vpcc_unit_size" or "ssnu_nal_unit_size" syntax element may be used to specify the size of each V-PCC or NAL unit syntax structure that follows. In the current test model (TM) implementation of the sample stream format for V-PCC and NAL units, a two-path approach is taken; the first path may find the maximum size of sample stream V-PCC/NAL unit structures, while the second path may form the sample stream header by setting its unit size precision based on this max value. The NAL sample bitstream may then create a sequence of sample stream units.

Figures 11, 11A, 11B:
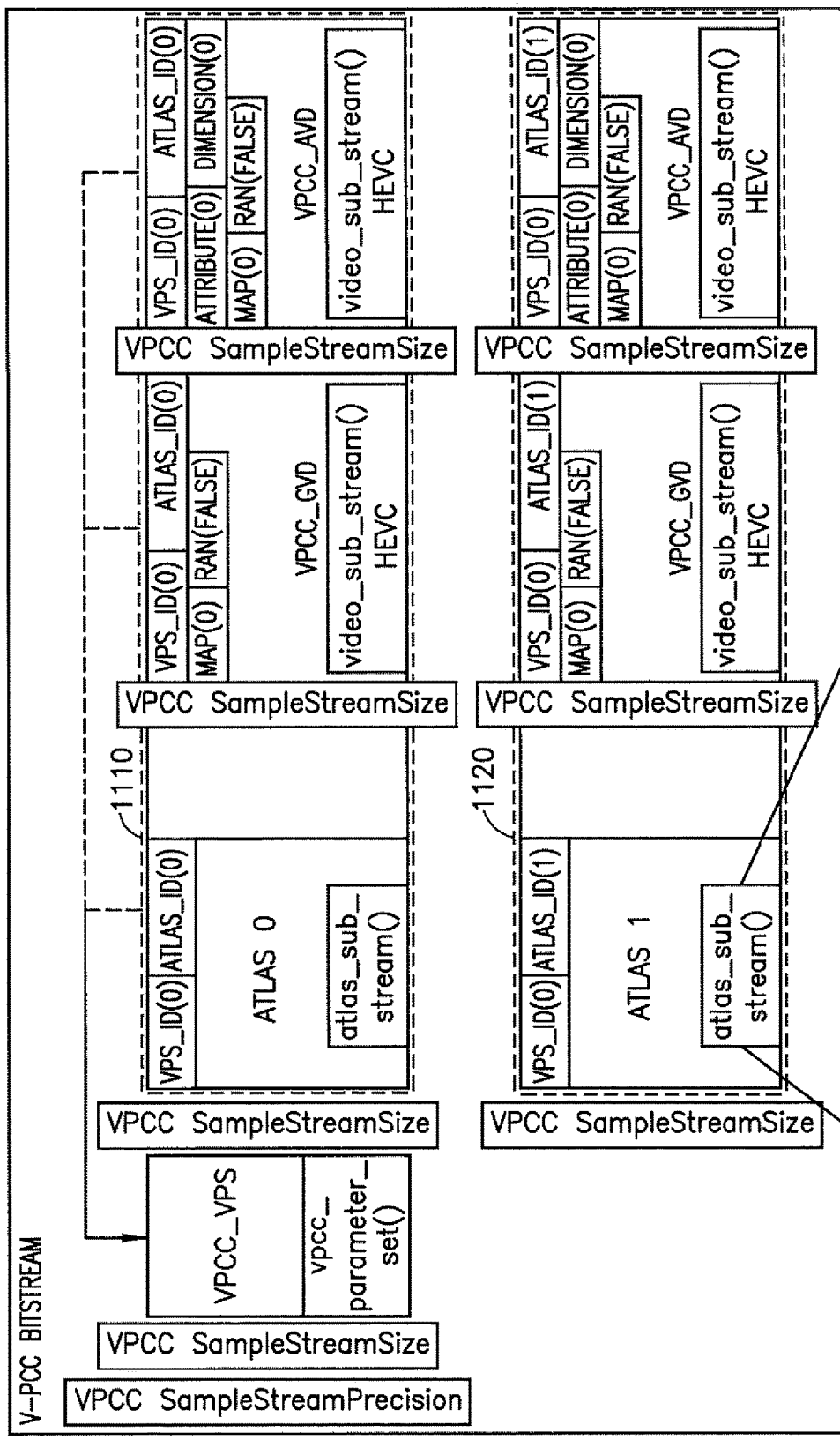
FIGS. 11A and 11B are a diagram illustrating features of an example bitstream as described herein.
Figure 11B:
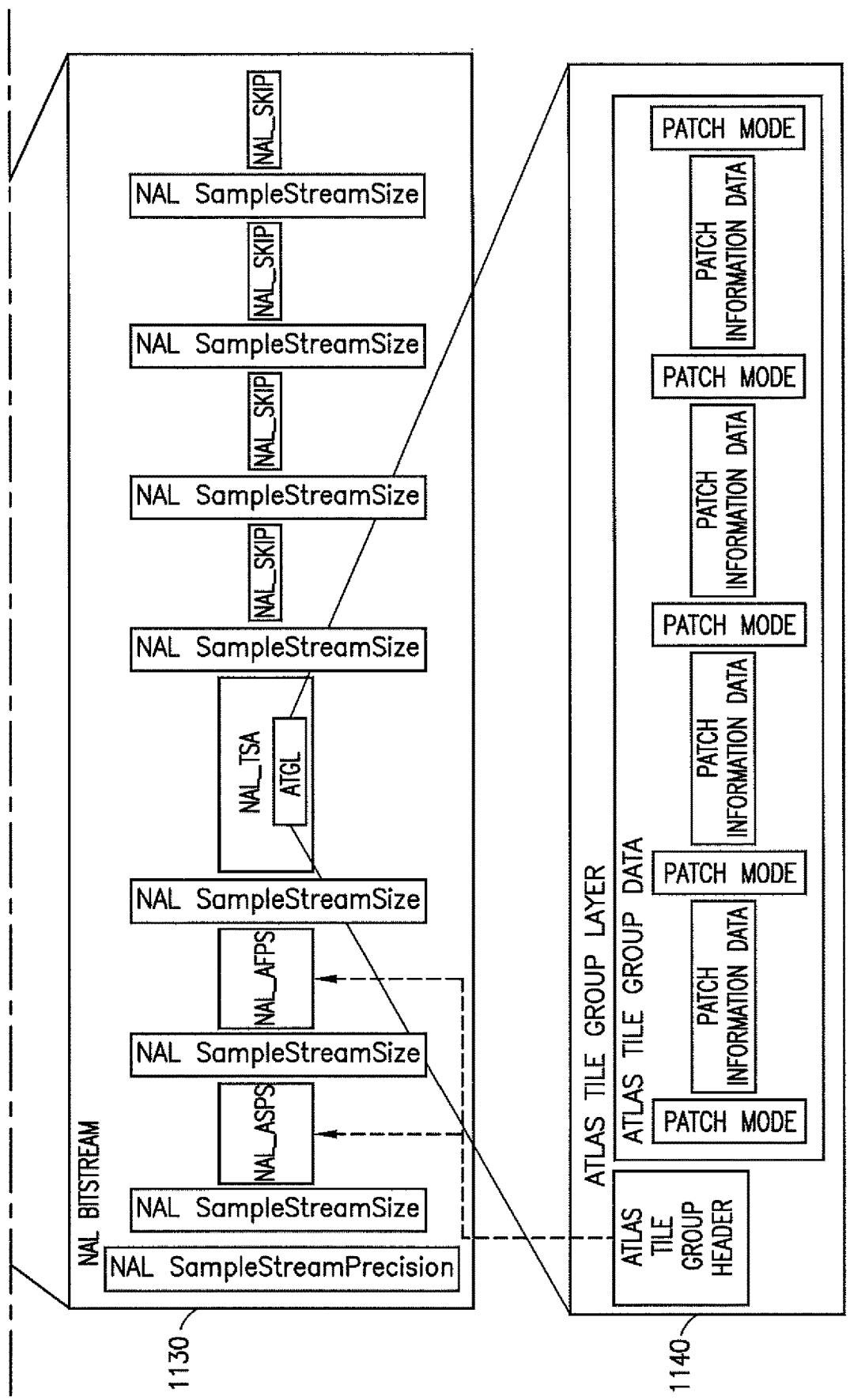

The V-PCC and NAL unit sample stream format classes may be redesigned to avoid this two-path approach by calculating the size precision at each instance of sample stream unit syntax structure. Referring now to FIG. 11, including FIGS. 11A and 11B, illustrated is an example of a compressed dynamic point cloud content bitstream (e.g. V-PCC bitstream) using multiple atlases. In the example, Atlas 0 (1100) and Atlas 1 (1120) may each be associated with a NAL bitstream having its own sample stream header specifying a precision. In the example of FIG. 11B, Atlas 1 (1120) is illustrated as being associated with a NAL Bitstream (1130), which is associated with an atlas tile group layer (1140). However, in the example of FIG. 11B, the implementation number of tile groups may be limited to a single tile group (i.e. 1140) for an atlas frame (i.e. 1120). Moreover, in its present implementation there may be a lack of support for atlas frame order count (AFOC)-based NAL unit type identification, as well as a lack of support for cases where reordering of atlas frame inputs may become necessary i.e. hierarchical P- and B-prediction.

An atlas may be considered auxiliary patch information. For each patch, some or all of the following metadata may be encoded/decoded: Index of the projection plane (Index 0 for the plane (1.0, 0.0, 0.0); Index 1 for the plane (0.0, 1.0, 0.0); Index 2 for the plane (0.0, 0.0, 1.0); Index 3 for the plane (−1.0, 0.0, 0.0); Index 4 for the plane (0.0, −1.0, 0.0); Index 5 for the plane (0.0, 0.0, −1.0)); 2D bounding box (u0, v0, u1, v1); and/or 3D location (x0, y0, z0) of the patch represented in terms of depth δ0, tangential shift s0, and/or bi-tangential shift r0.

According to the chosen projection planes, (δ0, s0, r0) may be computed as follows: Index 0, δ0=x0, s0=z0 and r0=y0; Index 3, δ0=x0, s0=z0 and r0=y0; Index 1, δ0=y0, s0=z0 and r0=x0; Index 4, δ0=y0, s0=z0 and r0=x0; Index 2, δ0=z0, s0=x0 and r0=y0; Index 5, δ0=z0, s0=x0 and r0=y0. An addition to the index list to define the normal axis may be used for the additional 45-degree projection planes: Index 6 for the plane $$\left(\frac{\sqrt{2}}{2}, 0.0, \frac{\sqrt{2}}{2}\right);$$

Index 7 for the plane $$\left(\frac{\sqrt{2}}{2}, 0.0, -\frac{\sqrt{2}}{2}\right);$$

Index 8 for the plane $$\left(-\frac{\sqrt{2}}{2}, 0.0, \frac{\sqrt{2}}{2}\right);$$

Index 9 for the plane $$\left(-\frac{\sqrt{2}}{2}, 0.0, -\frac{\sqrt{2}}{2}\right);$$

The mapping information providing, for each T×T block, its associated patch index may be represented as follows: For each T×T block, let L be the ordered list of the indexes of the patches such that their 2D bounding box contains that block. The order in the list may be the same as the order used to encode the 2D bounding boxes. L may be the list of candidate patches. The empty space between patches may be considered as a patch and assigned the special index 0, which may be added to the candidate patches list of all the blocks. I may be an index of the patch to which belongs the current T×T block.

Table 1 gives an example of patch data unit syntax:

TABLE 1

| | Descriptor |
|---|---|
| patch_data_unit( tileID, patchIdx ) { | |
|   pdu_2d_pos_x[ tileID ][ patchIdx ] | ue(v) |
|   pdu_2d_pos_y[ tileID ][ patchIdx ] | ue(v) |
|   pdu_2d_size_x_minus1[ tileID ][ patchIdx ] | ue(v) |
|   pdu_2d_size_y_minus1[ tileID ][ patchIdx ] | ue(v) |
|   pdu_3d_offset_u[ tileID ][ patchIdx ] | u(v) |
|   pdu_3d_offset_v[ tileID ][ patchIdx ] | u(v) |

TABLE 1-continued

| | Descriptor |
|---|---|
| pdu_3d_offset_d[ tileID ][ patchIdx ] | u(v) |
| if( asps_normal_axis_max_delta_value_enabled_flag ) | |
|    pdu_3d_range_d[ tileID ][ patchIdx ] | u(v) |
| pdu_projection_id[ tileID ][ patchIdx ] | u(v) |
| pdu_orientation_index[ tileID ][ patchIdx ] | u(v) |
| if( afps_lod_mode_enabled_flag ) { | |
|    pdu_lod_enabled_flag[ tileID ][ patchIdx ] | u(1) |
|    if( pdu_lod_enabled_flag[ tileID ][ patchIdx ] > 0 ) { | |
|       pdu_lod_scale_x_minus1[ tileID ][ patchIdx ] | ue(v) |
|       pdu_lod_scale_y_idc[ tileID ][ patchIdx ] | ue(v) |
|    } | |
| } | |
| if( asps_plr_enabled_flag ) | |
|    plr_data( tileID, patchIdx ) | |
| } | |

Figure 12A:
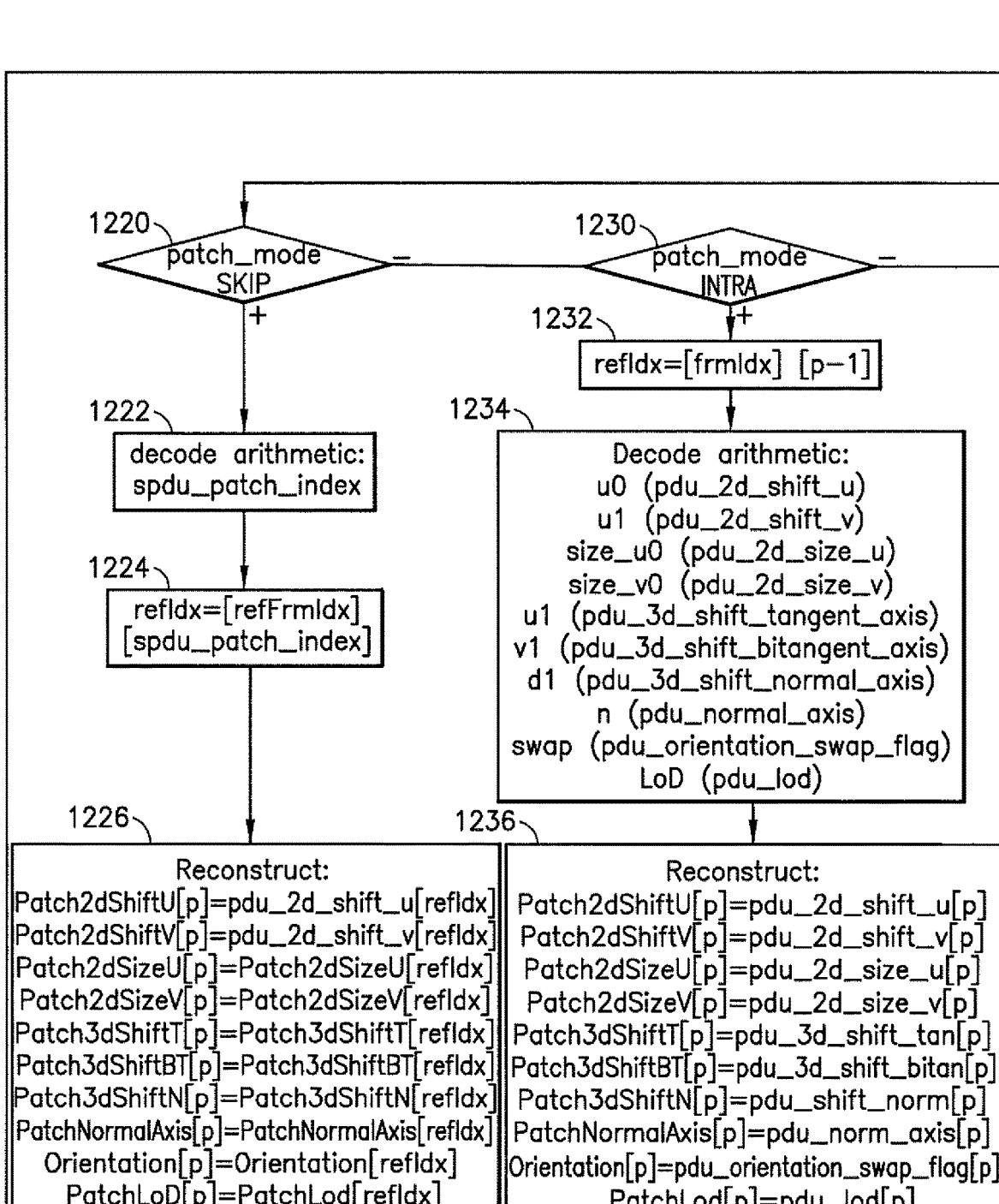
Figure 12B:
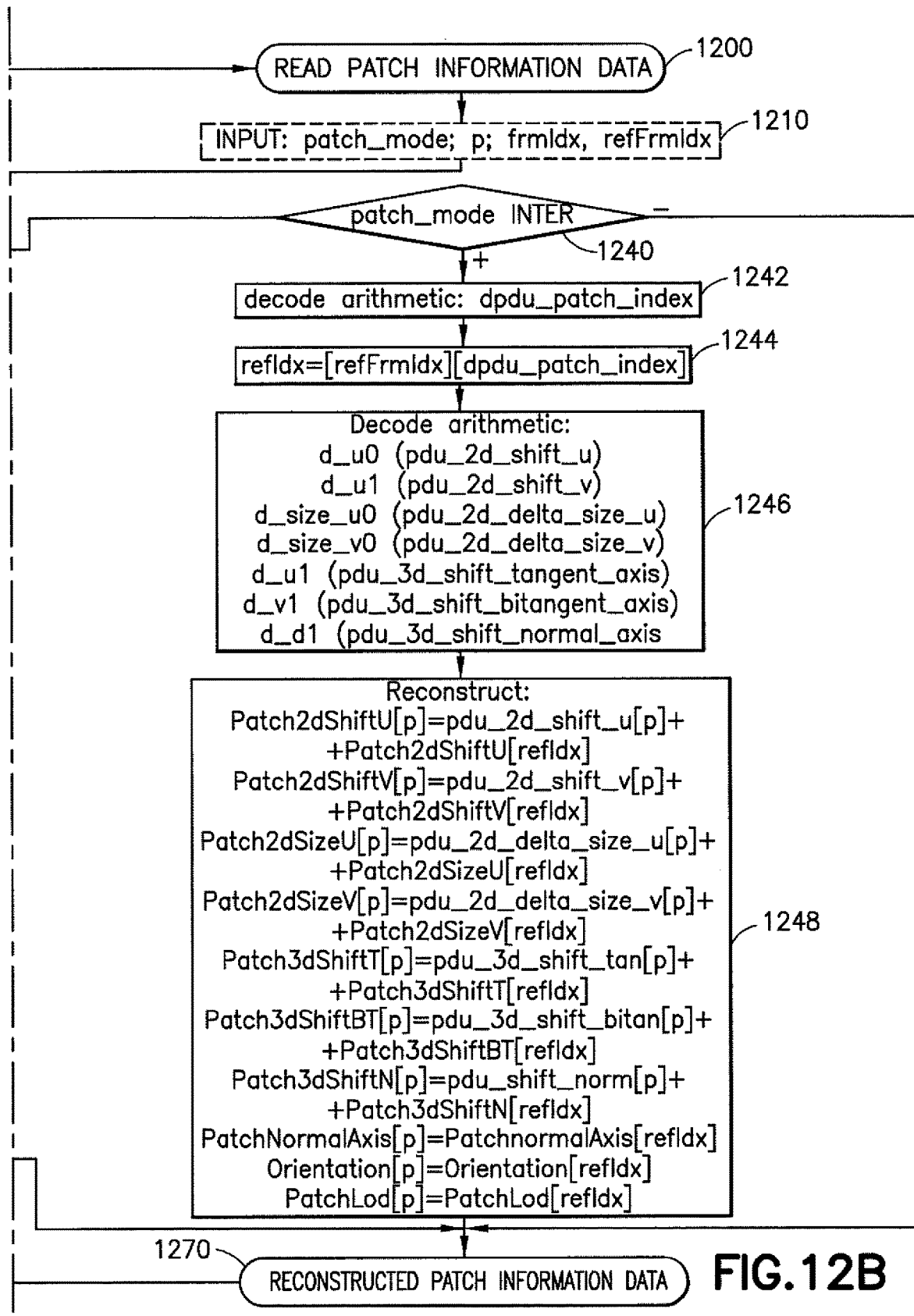

Referring now to FIG. 12, including FIGS. 12A, 12B, and 12C, illustrated is an example flowchart for use by a patch data unit to decode decompressed volumetric video data. For example, geometry/attribute reconstruction 470 of FIG. 4 may conduct decoding of decompressed information according to the flowchart of FIG. 12.

At 1200, patch information data may be read. In an example, the input from the patch information data may be patch_mode, p, frmIdx, and/or refFrmIdx, 1210. At 1220, if patch_mode is SKIP, the arithmetic, spud_patch_index, may be decoded (1222), the refIdx may equal the value of [refFrmIdx][spud_patch_index] (1224), and the patch may be reconstructed (1270) according to one or more of the illustrated parameters (1226) (e.g. Patch2dShiftU[p]=pdu_2d_shift_u[refIdx]; Patch2dShiftV[p]=pdu_2d_shift_v[refIdx]; Patch2dSizeU[p]Patch2dSizeU[refIdx]; Patch2dSizeV[p]=Patch2dSizeV[refIdx]; Patch3dShiftT[p]= Patch3dShiftT[refIdx]; Patch3dShiftBT[p]= Patch3dShiftBT[refIdx]; Patch3dShiftN[p]=Patch3dShiftN [refIdx]; PatchNormalAxis[p]=PatchNormalAxis[refIdx]; Orientation[p]=Orientation[refIdx]; PatchLoD[p]=PatchLod[refIdx]).

Else, at 1230, if patch_mode is INTRA, refIdx [frmIdx][p-1] (1232), one or more of the illustrated arithmetic (e.g. u0(pdu_2d_shift_u); u1(pdu_2d_shift_v); size_u0 (pdu_2d_size_u); size_v0(pdu_2d_size_v); u1(pdu_3d_shift_tangent_axis); v1(pdu_3d_shift_bitangent_axis); d1(pdu_3d_shift_normal_axis); n(pdu_normal_axis); swap (pdu_orientation_swap_flag); LoD(pdu_lod)) may be decoded (1234), and the patch may be reconstructed (1270) according to one or more of the illustrated parameters (1236) (e.g. Patch2dShiftU[p]=pdu_2d_shift_u[p]; Patch2dShiftV [p]=pdu_2d_shift_v[p]; Patch2dSizeU[p]=pdu_2d_size_u [p]; Patch2dSizeV[p]=pdu_2d_size_v[p]; Patch3dShiftT [p]= pdu_3d_shift_tan[p]; Patch3dShiftBT[p]= pdu_3d_shift_bitan[p]; Patch3dShiftN[p]=pdu_shift_norm [p]; PatchNormalAxis[p]=pdu_norm_axis[p]; Orientation [p]=pdu_orientation_swap_flag[p]; PatchLoD[p]=pdu_lod [p].

Else, at 1240, if patch_mode is INTER, the arithmetic, dpdu_patch_index, may be decoded (1242), the refIdx may be equal to [refFrmIdx][dpdu_patch_index] (1244), one or more of the illustrated arithmetic (e.g. d_u0 (pdu_2d_shift_u); d_u1(pdu_2d_shift_v); d_size_u0 (pdu_2d_delta_size_u); d_size_v0(pdu_2d_delta_size_v); d_u1(pdu_3d_shift_tangent_axis); d_v1 (pdu_3d_shift_bitangent_axis); d_d1 (pdu_3d_shift_normal_axis); d_d1 (pdu_3d_shift_normal_axis)) may be decoded (1246), and the patch may be reconstructed (1270) according to one or more of the illustrated parameters (1248) (e.g. Patch2dShiftU[p]=pdu_2d_shift_u[p]++Patch2dShiftU[refIdx]; Patch2dShiftV[p]=pdu_2d_shift_v[p]++ Patch2dShiftV[refIdx]; Patch2dSixeU[p]= pdu_2d_delta_size_u[p]++Patch2dSizeU[refIdx]; Patch2dSixeV[p]=pdu_2d_delta_size_v[p]++Patch2dSizeV [refIdx]; Patch3dShiftT[p]=pdu 3d_shift_tan[p]++ Patch3dShiftT[refIdx]; Patch3dShiftBT[p]= pdu_3d_shift_bitan[p]++Patch3dShiftBT[refIdx]; Patch3dShiftN[p]=pdu_shift_norm[p]++Patch3dShiftN[refIdx]; PatchNormalAxis[p]=PatchnormalAxis[refidx]; Orientation[p]=Orientation[refIdx]; PatchLod[p]=PatchLod[refIdx]).

Else, at 1250, if patch_mode is PCM, refIdx may be equal to [frmIdx][p-1] (1252), one or more of the illustrated arithmetic (e.g. separate video flag(ppdu_patch . . . ); u0(ppdu_2d_shift_u); u1(ppdu_2d)shift_v); d_size_u0 (ppdu_2d_delta_size_u); d_size_v0 (ppdu_2d_delta_size_v); PCM points (ppdu_pcm_points)) may be decoded (1254), and the patch may be reconstructed (1270) according to the illustrated parameters (1256) (e.g. Patch2dShiftU[p]=pdu_2d_shift_u[p]; Patch2dShiftV[p]= pdu_2d_shift_v[p]; Patch2dSizeU[p]=pdu_2d_delta_size_u [p]++Patch2dSizeU[refIdx]; Patch2dSizeV[p]= pdu_2d_delta_size_v[p]++Patch2dSizeV[refIdx]; PatchPomPoints[p]=ppdu_pcm_points[p]).

Else, at 1260, if patch_mode is LAST, the reconstruction process for patch_frame_data_unit may be finished, 1280.

The decoding of a bitstream, which may be according to FIG. 4 and/or FIG. 12, may take place at a decoder having a specific profile. Profiles, tiers, and levels may specify restrictions on the bitstreams, and hence limits on the capabilities needed to decode the bitstreams. Profiles, tiers, and levels may also be used to indicate interoperability points between individual decoder implementations. Each profile may specify a subset of algorithmic features and limits that may be supported by all decoders conforming to that profile.

Each level of a tier may specify a set of limits on the values that may be taken by syntax elements. The same set of tier and level definitions may be used with all profiles, but individual implementations may support different tier(s) and, within a given tier, different level(s) for each supported profile. For any given profile, a level of a tier may generally correspond to a particular decoder processing load and/or memory capability.

Table 2 gives an example of profile, tier, and level syntax:

TABLE 2

| | Descriptor |
|---|---|
| profile_tier_level( ) { | |
|    ptl_tier_flag | u(1) |
|    ptl_profile_codec_group_idc | u(7) |
|    ptl_profile_toolset_idc | u(8) |
|    ptl_profile_reconstruction_idc | u(8) |
|    ptl_reserved_zero_16bits | u(16) |
|    ptl_reserved_0xffff_16bits | u(16) |
|    ptl_level_idc | u(8) |
|    ptl_num_sub_profiles | u(6) |
|    ptl_extended_sub_profile_flag | u(1) |
|    for( i = 0; i < ptl_num_sub_profiles; i++ ) | |
|       ptl_sub_profile_idc[ i ] | u(v) |
|    ptl_tool_constraints_present_flag | u(1) |
|    if( ptl_toolset_constraints_present_flag ) | |
|       profile_toolset_constraints___information( ) | |
| } | |

Table 3 gives an example of general V3C parameter set syntax, which may be part of V3C unit header syntax:

TABLE 3

|  | Descriptor |
|---|---|
| v3c_parameter_set( numBytesInV3CPayload ) {<br>  profile_tier_level( )<br>  ...<br>  byte_alignment( )<br>} | u(4) |

Table 4 gives an example of a general frame parameter set raw byte sequence payload (RBSP) syntax:

TABLE 4

|  | Descriptor |
|---|---|
| atlas_frame_parameter_set_rbsp( ) { |  |
|   afps_atlas_frame_parameter_set_id | ue(v) |

TABLE 4-continued

|  | Descriptor |
|---|---|
|   afps_atlas_sequence_parameter_set_id | ue(v) |
|   atlas_frame_tile_information( ) |  |
|   afps_output_flag_present_flag | u(1) |
|   afps_num_ref_idx_default_active_minus1 | ue(v) |
|   afps_additional_lt_afoc_lsb_len | ue(v) |
|   afps_lod_mode_enabled_flag | u(1) |
|   afps_raw_3d_offset_bit_count_explicit_mode_flag | u(1) |
|   afps_extension_present_flag | u(1) |
|   if( afps_extension_present_flag ) |  |
|     afps_extension_8bits | u(8) |
|   if( afps_extension_8bits ) |  |
|     while( more_rbsp_data( ) ) |  |
|       afps_extension_data_flag | u(1) |
|   rbsp_trailing_bits( ) |  |
| } |  |

V3C bitstream profiles may be determined based on the maximum required profile, level, and tier limits indicated for the whole sequence, as discussed above. Table 5 gives examples of general V3C or VPS related level limits:

TABLE 5

| Level | Max # of PROJECTED points per second MaxNumProjPointsPerSec | Max # of EOM points per second MaxNumEOMPointsPerSec | Max # of RAW points per second MaxNumRawPointsPerSec | Max # of PROJECTED points per atlas MaxNumProjPoints | Max # EOM points per atlas MaxNumEOMPoints |
|---|---|---|---|---|---|
| 1.0 | 30 000 000 | 1 500 000 | 1 500 000 | 1 000 000 | 50 000 |
| 1.5 | 60 000 000 | 3 000 000 | 3 000 000 | 2 000 000 | 100 000 |
| 2.0 | 120 000 000 | 6 000 000 | 6 000 000 | 4 000 000 | 200 000 |
| 2.5 | 240 000 000 | 12 000 000 | 12 000 000 | 8 000 000 | 400 000 |
| 3.0 | 480 000 000 | 24 000 000 | 24 000 000 | 16 000 000 | 800 000 |
| 3.5 | 960 000 000 | 48 000 000 | 48 000 000 | 32 000 000 | 1 600 000 |

| Level | Max # RAW points per atlas MaxNumRawPoints | Max # of maps LevelMapCount | Max # of attributes MaxNumAttributeCount | Max # of attribute dimensions MaxNumAttributeDims |
|---|---|---|---|---|
| 1.0 | 50 000 | 2 | 1 | 3 |
| 1.5 | 100 000 | 2 | 3 | 3 |
| 2.0 | 200 000 | 4 | 4 | 3 |
| 2.5 | 400 000 | 4 | 8 | 4 |
| 3.0 | 800 000 | 8 | 16 | 5 |
| 3.5 | 1 600 000 | 8 | 24 | 6 |

Table 6 gives examples of general atlas sequence parameter set (ASPS) and tile related level limits:

TABLE 6

| Level | Max # PROJECTED Patches per atlas MaxNumProjPatches | Max # RAW patches per atlas MaxNumRawPatches | Max # EOM patches per atlas MaxNumEOMPatches | Max CAB size MaxCABSize in 1 000 bits | Max atlas bit rate MaxAtlasBR in 1 000 bits/s |
|---|---|---|---|---|---|
| 1.0 | 2 048 | 32 | 32 | 15 000 | 15 000 |
| 1.5 | 4 096 | 64 | 32 | 30 000 | 30 000 |
| 2.0 | 16 384 | 128 | 64 | 120 000 | 120 000 |
| 2.5 | 32 384 | 128 | 64 | 240 000 | 240 000 |
| 3.0 | 65 536 | 512 | 128 | 480 000 | 480 000 |
| 3.5 | 65 536 | 512 | 512 | 480 000 | 480 000 |

| Level | Max # number of tiles per atlas MaxNumTiles | Max atlas size MaxAltasSize | Max PROJECTED patch rate MaxProjectedPatchRate (patches/s) | Max RAW patch rate MaxRawPatchRate (patches/s) | Max EOM patch rate MaxEOMPatchRate (patches/s) |
|---|---|---|---|---|---|
| 1.0 | 50 | 2 228 224 | 65 536 | 1 024 | 1 024 |
| 1.5 | 50 | 2 228 224 | 131 072 | 2 048 | 1 024 |
| 2.0 | 200 | 8 912 896 | 524 288 | 4 096 | 2 048 |
| 2.5 | 200 | 8 912 896 | 1 036 288 | 4 096 | 2 048 |
| 3.0 | 500 | 35 651 584 | 2 097 152 | 16 384 | 4 096 |
| 3.5 | 500 | 35 651 584 | 4 194 304 | 32 768 | 32 768 |

Table 7 gives examples of general video bitstream level limits:

TABLE 7

| Level | Max luma picture size in MaxPictureSize (samples) | Max aggregate luma sample rate MaxAggregateLumaSr (samples/sec) | Max # 1000 bits/s per video stream MaxBitRatePerStream MT | HT | Max aggregate # 1000 bits/s MaxAggregateBitRate MT | HT |
|---|---|---|---|---|---|---|
| 1.0 | 2 228 224 | 133 693 440 | 12 000 | 30 000 | 25 000 | 100 000 |
| 1.5 | 2 228 224 | 267 386 880 | 20 000 | 50 000 | 40 000 | 160 000 |
| 2.0 | 8 912 896 | 534 773 760 | 25 000 | 100 000 | 60 000 | 240 000 |
| 2.5 | 8 912 896 | 1 069 547 520 | 60 000 | 240 000 | 120 000 | 480 000 |
| 3.0 | 35 651 584 | 2 139 095 040 | 60 000 | 240 000 | 120 000 | 480 000 |
| 3.5 | 35 651 584 | 4 278 190 080 | 240 000 | 800 000 | 480 000 | 1 600 000 |

Based on an indicated level, the decoder may allocate the required resource(s) needed to decode the bitstream correctly. The decoder may also indicate the required resources to a playback/rendering unit to ensure correct playback. This resource allocation might only be performed at the beginning of the decoding process and might not be updated to match any changes in the received content.

As noted above, volumetric video data may allow for a user to view a 3D scene or object with 6DoF, meaning that a user may navigate around the 3D scene or object and view it from any/all direction(s). Because volumetric video data may require a large amount of data in order to make this navigation possible, the concepts of a viewing space and a viewport may be useful. A "viewing space" may be defined as the portion of the 3D space, possibly completed by viewing direction constraints, where the "viewport" can be rendered with sufficient quality during a VR/AR/MR experience. A "viewport" may be defined as a region of an omnidirectional/volumetric image or video suitable for display and viewing by the user, e.g. based on the viewing location/orientation of the user with reference to the 3D scene or object. Regions outside the "viewport" may have a different or lower quality. The viewing space may be configured to give the end device (e.g. HMD) the opportunity to handle viewing space exceedance. In other words, the viewing space may be configured to be large enough that sufficient/high-quality video may be rendered to the user even as the viewport moves within the viewing space. A viewing space inclusiveness factor may be computed where "0" indicates fully inside and "1" indicates fully outside. These values are non-limiting; other values or additional values may be used. The end device application may use this factor to take a viewers' transience, from inside the viewing space to outside, into account. This information may be included in viewing space supplemental enhancement information (SEI).

The construction of the viewing space may be based on a list of elementary shapes which may themselves be based on a list of primitive shapes. The primitive shapes may be built into elementary shapes through a CSG (Constructive Solid Geometry) operation or through an interpolation operation, and these elementary shapes may be combined via CSG addition, subtraction, or intersection as defined by elementary shape operation, for example in the strict order of the list of elementary shapes. This information may be included in a viewing space SEI.

When viewing space handling methods are present in a viewing space SEI payload, the target device may select a first matching handling method. Matching may be performed based on a device and application class of the target device. When none of the viewing space handling methods match with the target device, no viewing space handling is provided. In that case, the target device may choose an appropriate handling based on the viewing space information alone.

Features as described herein may generally relate to allocation of decoder resources. In projection-based 3D data compression, such as MPEG Visual Volumetric Video-based Coding (V3C), 3D data is projected on 2D patches, video encoded, and reconstructed into 3D space at the decoder side. Decoder requirements to ensure accurate decoding and rendering of such data may be carried at the sequence level in the form of profile, tier, and level indicators. This approach to indicating decoder requirements may be sufficient for 2D video and for model-based volumetric video, as the chance of the decoded data becoming suddenly significantly more or less complex is low. Accordingly, for 2D video and for model-based volumetric video, profile, tier, and level indicators might not need to be refreshed regularly.

However, in scenery-based immersive video (MIV), it is more likely that decoded data will suddenly become significantly more or less complex (e.g. the complexity may change by at least a threshold amount). Accordingly, it may be sub-optimal to limit indication of profile, tier, and level information at the sequence level. With a finer granulation, a decoder may be able to free available resources if not needed, or prepare necessary resources for upcoming heavier decoding/rendering tasks. In an example embodiment, adding a "pre-emptive" nature to this signaling (e.g. "in 50 frames the rendering complexity will increase twofold") may ensure that a decoder has time to free up the required resources to ensure smooth and real-time decoding & playback of heterogenous immersive video content (i.e. content with varying levels of rendering or decoding complexity).

In an example embodiment, a set of new syntax elements may be configured to allow decoders and their linked rendering units to allocate computing resources accurately for upcoming increases or decreases of computational load when decoding/rendering a V3C bitstream may be introduced.

Example embodiments of the present disclosure may relate to immersive video scenarios in which an immersive volumetric scene is represented by a Visual Volumetric Video-based Coding (V3C) bitstream or similar representation. For example, the original 3D data may be represented as video-coded 2D projections with accompanying metadata. A decoder may decode the 2D video stream(s) and recreate the 3D scenery by remapping the 2D video information into 3D space. Certain time instances of the 3D scenery (or model) may have a higher (or lower) complexity than other time instances associated with the scene, and therefore higher (or lower) computational requirements for decoding and playback. Examples of such variations in complexity may include, but are not limited to: objects or people entering the scene (higher complexity); objects or people leaving the scene (lower complexity); visual effects, e.g. explosions, fireworks (increasing/decreasing 3D detail); 3D deformations (increasing/decreasing 3D detail); texture changes (increasing/decreasing texture detail); or a combination of the above.

Performing resource allocation only at the beginning of the decoding process might not be optimal; more frequent resource allocation may ensure that required resources are available when needed and can be distributed to other processes when not needed. In an example embodiment, profile, level, and tier exemption signaling in the V3C bitstream, rather than at the sequence level, may be introduced.

In an example embodiment, an encoder may be given/receive/determine certain bitstream constraints such as profile, toolset, level, and tier, e.g. indicated by syntax elements ptl_profile_toolset_idc, ptl_profile_reconstruction_idc, ptl_level_idc or ptl_tier_idc for V3C bitstreams (see Table 2). In an example embodiment, the encoder may gain/receive information on periods of unusually high or unusually low complexity for the content that is to be encoded. For example, unusually high complexity may be complexity above a profile restriction indicated by pty_level_idc or ptl_tier_idc, while unusually low complexity may be complexity below a profile restriction indicated by pty_level_idc or ptl_tier_idc. Such information may be manually input by a user or derived from automatic content analysis in a pre-encoding step. The encoder may then signal these exemptions/changes in complexity as part of the atlas frame parameter set. Table 8 gives an example of the general atlas frame parameter set raw byte sequence payload (RBSP) syntax including such exemptions:

TABLE 8

| | Descriptor |
|---|---|
| atlas_frame_parameter_set_rbsp( ) { | |
|   afps_atlas_frame_parameter_set_id | ue(v) |
|   ... | |
|   if( afps_extension_8bits ) | |
|     while( more_rbsp_data( ) ) | |
|       afps_extension_data_flag | u(1) |
|   afps_level_exemption_flag | u(1) |
|   if( afps_extension_present_flag ) | |
|     afps_level_change | u(8) |
|   rbsp_trailing_bits( ) | |
| } | |

In the example of Table 8, the atlas frame parameter set RBSP syntax includes an afps_level_exemption_flag. An afps_level_exemption_flag value equal to "1" may specify that the syntax element afps_level_change is present in the atlas_frame_parameter_set_rbsp syntax structure. The syntax element afps_level_change may indicate a new value to be used for ptl_level_idc for the current atlas frame. An afps_level_exemption_flag value equal to "0" may specify that the syntax element afps_level_change is not present in the syntax structure. These values are non-limiting; other values or additional values may be used.

A technical effect of example embodiments of the present disclosure may be to allow for frame-accurate changes in resource allocation. However, typically resource allocation cannot be done instantaneously. In an example embodiment, the encoder may signal exemptions and the necessary/associated lead times as part of the atlas frame parameter set. Table 9 gives an example of the general atlas frame parameter set RBSP syntax including exemptions as well as lead times:

TABLE 9

| | Descriptor |
|---|---|
| atlas_frame_parameter_set_rbsp( ) { | |
|   afps_atlas_frame_parameter_set_id | ue(v) |
|   ... | |
|   if( afps_extension_8bits ) | |
|     while( more_rbsp_data( ) ) | |
|       afps_extension_data_flag | u(1) |
|   afps_level_exemption_flag | u(1) |
|   if( afps_extension_present_flag ) | |
|     afps_level_change | u(8) |
|     afps_level_change_lead | ue(v) |
|     afps_level_change_duration | ue(v) |
|   rbsp_trailing_bits( ) | |
| } | |

In the example of Table 9, syntax elements afps_level_change_lead and afps_level_change_duration are included. The value of afps_level_change_lead may indicate the lead time (e.g. in frames) until the level change indicated by afps_level_change occurs. The value of afps_level_change_duration may indicate how long (e.g. in frames) the level change indicated by afps_level_change may last.

It should be noted that it is possible to just indicate the lead time (e.g. afps_level_change_lead) or just the duration (e.g. afps_level_change_duration). However, indicating both values may be efficient/useful.

It should also be noted that other profile or tier restrictions may be updated in a similar manner. In other words, syntax elements may be included that specifically relate to profile or tier, rather than level, as in the examples of Tables 9 and 10. However, some updates may require new decoder instances to be initialized. Including syntax elements that relate to level may be more efficient and practicable.

In an example, the decoder may receive, at a certain time, a bitstream at level 2.0 as indicated by ptl_level_idc in the V3C parameter set syntax. With the current decoded frame, the decoder may receive afps_level_change information indicating level 3.0 in 100 frames' time for the following 50 frames. The decoder may use the 100 frames lead time to increase memory buffers, increase computational performance (e.g. boost clock speed), and inform the linked rendering unit to prepare additional resources, e.g. reallocate resources from lower priority processes. After 150 frames in total the resource level may be dropped to normal again. Alternatively, if there are no further computing resources available or no computing resources that can be reallocated according to the received signaling indicating a change in complexity, the decoder may ignore such signaling.

In another example, the decoder may receive, at a certain time, a bitstream at level 2.0 as indicated by ptl_level_idc in the V3C parameter set syntax. With the current decoded frame, the decoder may receive afps_level_change information indicating level 1.0 in 50 frames' time for the following 200 frames. The decoder may use the 50 frames lead time to reduce memory buffers, reduce computational performance (e.g. reduce clock speed to save power), and inform the linked rendering unit to reduce computational load, e.g. power saving, or reallocate resources, e.g. allocate resources to other processes. After 250 frames in total, the resource level may be raised to normal again. Alternatively, the decoder may ignore signaling indicating a change in complexity. For example, the decoder: may not be able to reallocate resources quickly enough to make reallocation of resources worthwhile, may consider the duration of low complexity too short to make reallocation of resources worthwhile, may anticipate an increase in complexity soon after the upcoming decrease in complexity, etc.

A technical effect of example embodiments of the present disclosure may be to enable flexible and content-adaptive resource allocation for V3C decoding and playback. A technical effect of example embodiments of the present disclosure may be to enable resource-efficient decoding and playback of V3C content, e.g. reduced power consumption on V3C decoding & playback devices.

Figure 13:
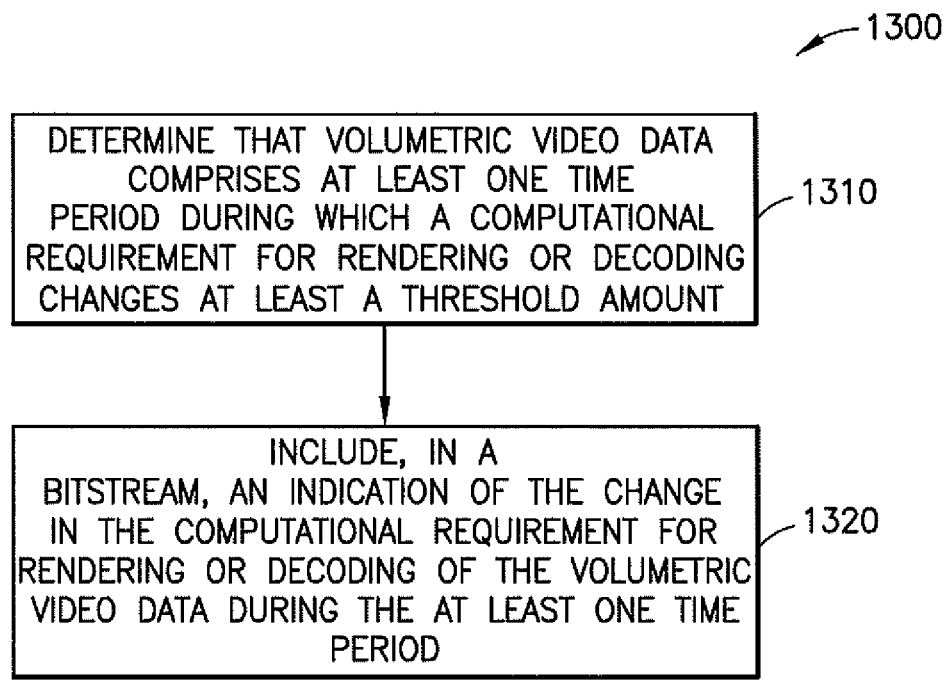
FIG. 13 is a flowchart illustrating steps of an example encoding process as described herein.

FIG. 13 illustrates the potential steps of an example method 1300. The example method 1300 may include: determining that volumetric video data comprises at least one time period during which a computational requirement for rendering or decoding changes at least a threshold amount, 1310; and including, in a bitstream, an indication of the change in the computational requirement for rendering or decoding of the volumetric video data during the at least one time period, 1320.

Figure 14:
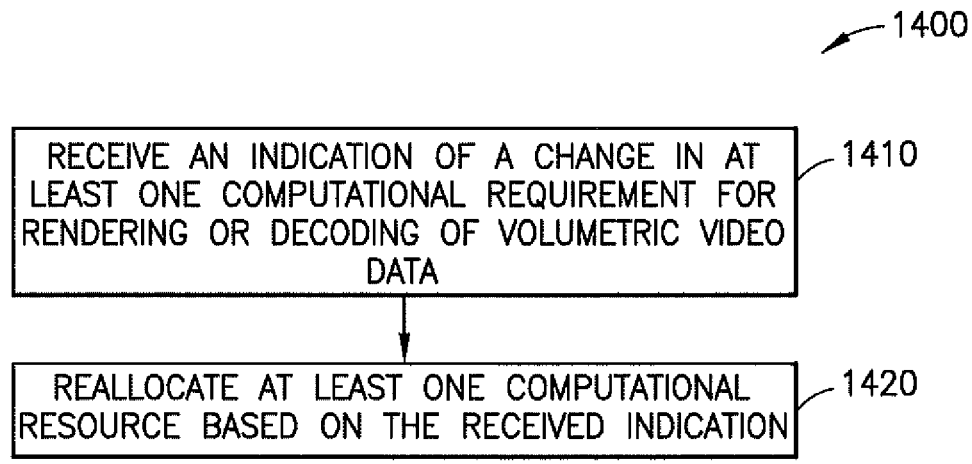
FIG. 14 is a flowchart illustrating steps of an example decoding process as described herein.

FIG. 14 illustrates the potential steps of an example method 1400. The example method 1400 may include: receiving an indication of a change in at least one computational requirement for rendering or decoding of volumetric video data, 1410; and reallocating at least one computational resource based on the received indication, 1420.

In accordance with one aspect, an example method may be provided comprising: determining that volumetric video data may comprise at least one time period during which a computational requirement for rendering or decoding changes at least a threshold amount; and including, in a bitstream, an indication of the change in the computational requirement for rendering or decoding of the volumetric video data during the at least one time period.

The computational requirement for rendering or decoding may be signaled in or along a the bitstream as at least one of: a profile indicator, or a level indicator.

The determining that the volumetric video data may comprise the at least one time period during which the computational requirement for rendering or decoding changes at least the threshold amount may comprise determining that the volumetric video data may comprise at least one of: a first object entering a scene; a second object leaving the scene; a visual effect; a three-dimensional deformation; a texture change; or a combination of two or more of: the first object, the second object, the visual effect, the three dimensional deformation, or the texture change.

The determining that the volumetric video data may comprise the at least one time period during which the computational requirement for rendering or decoding changes at least the threshold amount may comprise: receiving a manual input indicating that the computational requirement for rendering or decoding changes during the at least one time period.

The determining that the volumetric video data may comprise the at least one time period during which the computational requirement for rendering or decoding changes at least the threshold amount may comprise: performing content analysis of the volumetric video data during encoding or as a pre-encoding step.

The indication of the change in the computational requirement for rendering or decoding may comprise a flag, wherein the flag may be configured to indicate that at least one syntax element related to the change in the computational requirement for rendering or decoding is included in the bitstream.

The indication of the change in the computational requirement for rendering or decoding may comprise an indication of at least one of: a level change, a tier change, or a profile change for an associated decoder.

The indication of the change in the computational requirement for rendering or decoding may comprise an indication of a lead time for the change in the computational requirement for rendering or decoding.

The indication of the change in the computational requirement for rendering or decoding may comprise an indication of a duration for the change in the computational requirement for rendering or decoding.

In accordance with one example embodiment, an apparatus may comprise: at least one processor; and at least one memory including computer program code; the at least one memory and the computer program code configured to, with the at least one processor, cause the apparatus to: determine that volumetric video data may comprise at least one time period during which a computational requirement for rendering or decoding changes at least a threshold amount; and include, in a bitstream, an indication of the change in the computational requirement for rendering or decoding of the volumetric video data during the at least one time period.

The computational requirement for rendering or decoding may be signaled in or along a the bitstream as at least one of: a profile indicator, or a level indicator.

Determining that the volumetric video data may comprise the at least one time period during which the computational requirement for rendering or decoding changes at least the threshold amount may comprise determining that the volumetric video data may comprise at least one of: a first object entering a scene; a second object leaving the scene; a visual effect; a three-dimensional deformation; a texture change; or a combination of two or more of: the first object, the second object, the visual effect, the three dimensional deformation, or the texture change.

Determining that the volumetric video data may comprise the at least one time period during which the computational requirement for rendering or decoding changes at least the threshold amount may comprise: receiving a manual input indicating that the computational requirement for rendering or decoding changes during the at least one time period.

Determining that the volumetric video data may comprise the at least one time period during which the computational requirement for rendering or decoding changes at least the threshold amount may comprise: performing content analysis of the volumetric video data during encoding or as a pre-encoding step.

The indication of the change in the computational requirement for rendering or decoding may comprise a flag, wherein the flag may be configured to indicate that at least one syntax element related to the change in the computational requirement for rendering or decoding may be included in the bitstream.

The indication of the change in the computational requirement for rendering or decoding may comprise an indication of at least one of: a level change, a tier change, or a profile change for an associated decoder.

The indication of the change in the computational requirement for rendering or decoding may comprise an indication of a lead time for the change in the computational requirement for rendering or decoding.

The indication of the change in the computational requirement for rendering or decoding may comprise an indication of a duration for the change in the computational requirement for rendering or decoding.

In accordance with one example embodiment, an apparatus may comprise: processing circuitry; memory circuitry including computer program code, the memory circuitry and the computer program code configured to, with the processing circuitry, enable the apparatus to: determine that volumetric video data may comprise at least one time period during which a computational requirement for rendering or decoding changes at least a threshold amount; and include, in a bitstream, an indication of the change in the computational requirement for rendering or decoding of the volumetric video data during the at least one time period.

In accordance with one example embodiment, an apparatus may comprise: circuitry configured to perform: determine that volumetric video data may comprise at least one time period during which a computational requirement for rendering or decoding changes at least a threshold amount; and include, in a bitstream, an indication of the change in the computational requirement for rendering or decoding of the volumetric video data during the at least one time period.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The computational requirement for rendering or decoding may be signaled in or along a the bitstream as at least one of: a profile indicator, or a level indicator.

Determining that the volumetric video data may comprise the at least one time period during which the computational requirement for rendering or decoding changes at least the threshold amount may comprise determining that the volumetric video data may comprise at least one of: a first object entering a scene; a second object leaving the scene; a visual effect; a three-dimensional deformation; a texture change; or a combination of two or more of: the first object, the second object, the visual effect, the three dimensional deformation, or the texture change.

Determining that the volumetric video data may comprise the at least one time period during which the computational requirement for rendering or decoding changes at least the threshold amount may comprise: receiving a manual input indicating that the computational requirement for rendering or decoding changes during the at least one time period.

Determining that the volumetric video data may comprise the at least one time period during which the computational requirement for rendering or decoding changes at least the threshold amount may comprise: performing content analysis of the volumetric video data during encoding or as a pre-encoding step.

The indication of the change in the computational requirement for rendering or decoding may comprise a flag, wherein the flag may be configured to indicate that at least one syntax element related to the change in the computational requirement for rendering or decoding may be included in the bitstream.

The indication of the change in the computational requirement for rendering or decoding may comprise an indication of at least one of: a level change, a tier change, or a profile change for an associated decoder.

The indication of the change in the computational requirement for rendering or decoding may comprise an indication of a lead time for the change in the computational requirement for rendering or decoding.

The indication of the change in the computational requirement for rendering or decoding may comprise an indication of a duration for the change in the computational requirement for rendering or decoding.

In accordance with one example embodiment, an apparatus may comprise means for performing: determining that volumetric video data may comprise at least one time period during which a computational requirement for rendering or decoding changes at least a threshold amount; and including, in a bitstream, an indication of the change in the computational requirement for rendering or decoding of the volumetric video data during the at least one time period.

The computational requirement for rendering or decoding may be signaled in or along a the bitstream as at least one of: a profile indicator, or a level indicator.

The means may be configured to perform determining that the volumetric video data comprises the at least one time period during which the computational requirement for rendering or decoding changes at least the threshold amount may comprise means configured to perform determining that the volumetric video data comprises at least one of: a first object entering a scene; a second object leaving the scene; a visual effect; a three-dimensional deformation; a texture change; or a combination of two or more of: the first object, the second object, the visual effect, the three dimensional deformation, or the texture change.

The means configured to perform determining that the volumetric video data comprises the at least one time period during which the computational requirement for rendering or decoding changes at least the threshold amount may comprise means configured to perform: receiving a manual input indicating that the computational requirement for rendering or decoding changes during the at least one time period.

The means configured to perform determining that the volumetric video data comprises the at least one time period during which the computational requirement for rendering or decoding changes at least the threshold amount may comprise means configured to perform: content analysis of the volumetric video data during encoding or as a pre-encoding step.

The indication of the change in the computational requirement for rendering or decoding may comprise a flag, wherein the flag may be configured to indicate that at least one syntax element related to the change in the computational requirement for rendering or decoding is included in the bitstream.

The indication of the change in the computational requirement for rendering or decoding may comprise an indication of at least one of: a level change, a tier change, or a profile change for an associated decoder.

The indication of the change in the computational requirement for rendering or decoding may comprise an indication of a lead time for the change in the computational requirement for rendering or decoding.

The indication of the change in the computational requirement for rendering or decoding may comprise an indication of a duration for the change in the computational requirement for rendering or decoding.

In accordance with one example embodiment, a non-transitory computer-readable medium comprising program instructions stored thereon which, when executed with at least one processor, cause the at least one processor to: determine that volumetric video data may comprise at least one time period during which a computational requirement for rendering or decoding changes at least a threshold amount; and include, in a bitstream, an indication of the change in the computational requirement for rendering or decoding of the volumetric video data during the at least one time period.

In accordance with another example embodiment, a non-transitory program storage device readable by a machine may be provided, tangibly embodying a program of instructions executable by the machine for performing operations, the operations comprising: determine that volumetric video data may comprise at least one time period during which a computational requirement for rendering or decoding changes at least a threshold amount; and include, in a bitstream, an indication of the change in the computational requirement for rendering or decoding of the volumetric video data during the at least one time period.

In accordance with one aspect, an example method may be provided comprising: receiving an indication of a change in at least one computational requirement for rendering or decoding of volumetric video data; and reallocating at least one computational resource based on the received indication.

The receiving of the indication may comprise detecting a flag in a stream associated with the volumetric video data, wherein the flag is configured to indicate that at least one syntax element related to the change in the at least one computational requirement for rendering or decoding may be included in the stream.

The indication of the change in the at least one computational requirement for rendering or decoding may comprise an indication of at least one of: a level change, a tier change, or a profile change for an associated decoder.

The indication of the change in the at least one computational requirement for rendering or decoding may comprise an indication of a lead time for the change in one or more of the at least one computational requirement.

The indication of the change in the at least one computational requirement for rendering or decoding may comprise an indication of a duration for the change in one or more of the at least one computational requirements for rendering or decoding.

The at least one computational resource may comprise at least one of: at least one memory buffer, at least one processor, or at least one power source.

The reallocating of the at least one computational resource based on the received indication may comprise one of: increasing the at least one computational resource for rendering or decoding of the volumetric video data, or decreasing the at least one computational resource for rendering or decoding of the volumetric video data.

In accordance with one example embodiment, an apparatus may comprise: at least one processor; and at least one memory including computer program code; the at least one memory and the computer program code configured to, with the at least one processor, cause the apparatus to: receive an indication of a change in at least one computational requirement for rendering or decoding of volumetric video data; and reallocate at least one computational resource based on the received indication.

Receiving the indication may comprise detecting a flag in a stream associated with the volumetric video data, wherein the flag may be configured to indicate that at least one syntax element related to the change in the at least one computational requirement for rendering or decoding may be included in the stream.

The indication of the change in the at least one computational requirement for rendering or decoding may comprise an indication of at least one of: a level change, a tier change, or a profile change for an associated decoder.

The indication of the change in the at least one computational requirement for rendering or decoding may comprise an indication of a lead time for the change in one or more of the at least one computational requirement.

The indication of the change in the computational requirements for rendering or decoding may comprise an indication of a duration for the change in one or more of the at least one computational requirement for rendering or decoding.

The at least one computational resource may comprise at least one of: at least one memory buffer, at least one processor, or at least one power source.

The reallocating of the at least one computational resource based on the received indication may comprise one of: increasing the at least one computational resource for rendering or decoding of the volumetric video data, or decreasing the at least one computational resource for rendering or decoding of the volumetric video data.

In accordance with one example embodiment, an apparatus may comprise: processing circuitry; memory circuitry including computer program code, the memory circuitry and the computer program code configured to, with the processing circuitry, enable the apparatus to: receive an indication of a change in at least one computational requirement for rendering or decoding of volumetric video data; and reallocate at least one computational resource based on the received indication.

In accordance with one example embodiment, an apparatus may comprise: circuitry configured to perform: receive an indication of a change in at least one computational requirement for rendering or decoding of volumetric video data; and reallocate at least one computational resource based on the received indication.

Receiving the indication may comprise detecting a flag in a stream associated with the volumetric video data, wherein the flag may be configured to indicate that at least one syntax element related to the change in the at least one computational requirement for rendering or decoding may be included in the stream.

The indication of the change in the at least one computational requirement for rendering or decoding may comprise an indication of at least one of: a level change, a tier change, or a profile change for an associated decoder.

The indication of the change in the at least one computational requirement for rendering or decoding may comprise an indication of a lead time for the change in one or more of the at least one computational requirement.

The indication of the change in the at least one computational requirement for rendering or decoding may comprise an indication of a duration for the change in one or more of the at least one computational requirement for rendering or decoding.

The at least one computational resource may comprise at least one of: at least one memory buffer, at least one processor, or at least one power source.

The reallocating of the at least one computational resource based on the received indication may comprise one of: increasing the at least one computational resource for rendering or decoding of the volumetric video data, or decreasing the at least one computational resource for rendering or decoding of the volumetric video data.

In accordance with one example embodiment, an apparatus may comprise means for performing: receiving an indication of a change in at least one computational requirement for rendering or decoding of volumetric video data; and reallocating at least one computational resource based on the received indication.

The means configured to perform receiving of the indication may comprise means configured to perform detecting a flag in a stream associated with the volumetric video data, wherein the flag may be configured to indicate that at least one syntax element related to the change in the at least one computational requirements for rendering or decoding is included in the stream.

The indication of the change in the at least one computational requirements for rendering or decoding may comprise an indication of at least one of: a level change, a tier change, or a profile change for an associated decoder.

The indication of the change in at least one the computational requirements for rendering or decoding may comprise an indication of a lead time for the change in one or more of the at least one computational requirements.

The indication of the change in the at least one computational requirements for rendering or decoding may comprise an indication of a duration for the change in one or more of the at least one computational requirements for rendering or decoding.

The at least one computational resource may comprise at least one of: at least one memory buffer, at least one processor, or at least one power source.

The means configured to perform reallocating of the at least one computational resource based on the received indication may comprise means configured to perform one of: increasing the at least one computational resource for rendering or decoding of the volumetric video data, or decreasing the at least one computational resource for rendering or decoding of the volumetric video data.

In accordance with one example embodiment, a non-transitory computer-readable medium comprising program instructions stored thereon which, when executed with at least one processor, cause the at least one processor to: receive an indication of a change in at least one computational requirement for rendering or decoding of volumetric video data; and reallocate at least one computational resource based on the received indication.

In accordance with another example embodiment, a non-transitory program storage device readable by a machine may be provided, tangibly embodying a program of instructions executable by the machine for performing operations, the operations comprising: receive an indication of a change in at least one computational requirement for rendering or decoding of volumetric video data; and reallocate at least one computational resource based on the received indication.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
   at least one processor; and
   at least one non-transitory memory and computer program code, wherein the at least one memory and the computer program code are configured to, with the at least one processor, cause the apparatus to:
   determine that volumetric video data comprises at least one time period during which a computational requirement for rendering or decoding changes at least a threshold amount; and
   include, in a bitstream, an indication of the change in the computational requirement for rendering or decoding of the volumetric video data during the at least one time period, wherein the indication of the change in the computational requirement for rendering or decoding comprises an indication of a lead time for the change in the computational requirement for rendering or decoding.

2. The apparatus of claim 1, wherein the computational requirement for rendering or decoding is signaled in or along the bitstream as at least one of: a profile indicator, or a level indicator.

3. The apparatus of claim 1, wherein determining that the volumetric video data comprises the at least one time period during which the computational requirement for rendering or decoding changes at least the threshold amount comprises the at least one memory and the computer program code are configured to, with the at least one processor, cause the apparatus to:
   determine that the volumetric video data comprises at least one of:
   a first object entering a scene;
   a second object leaving the scene;
   a visual effect;
   a three-dimensional deformation;
   a texture change; or
   a combination of two or more of: the first object, the second object, the visual effect, the three dimensional deformation, or the texture change.

4. The apparatus of claim 1, wherein determining that the volumetric video data comprises the at least one time period during which the computational requirement for rendering or decoding changes at least the threshold amount comprises the at least one memory and the computer program code are configured to, with the at least one processor, cause the apparatus to:
   receive a manual input indicating that the computational requirement for rendering or decoding changes during the at least one time period.

5. The apparatus of claim 1, wherein determining that the volumetric video data comprises the at least one time period during which the computational requirement for rendering or decoding changes at least the threshold amount comprises the at least one memory and the computer program code are configured to, with the at least one processor, cause the apparatus to:

perform content analysis of the volumetric video data during encoding or as a pre-encoding step.

6. The apparatus of claim 1, wherein the indication of the change in the computational requirement for rendering or decoding comprises a flag, wherein the flag is configured to indicate that at least one syntax element related to the change in the computational requirement for rendering or decoding is included in the bitstream.

7. The apparatus of claim 1, wherein the indication of the change in the computational requirement for rendering or decoding comprises an indication of at least one of:
    a level change,
    a tier change, or
    a profile change
for an associated decoder.

8. The method of claim 1, wherein the indication of the change in the computational requirement for rendering or decoding comprises an indication of a duration for the change in the computational requirement for rendering or decoding.

9. The apparatus of claim 1, wherein the computational requirement is associated with at least one of:
    an increase in a level of complexity of the volumetric video data during the at least one time period,
    a decrease in the level of complexity of the volumetric video data during the at least one time period,
    an increase in a level of detail of the volumetric video data during the at least one time period, or
    a decrease in the level of detail of the volumetric video data during the at least one time period.

10. A method comprising:
    determining that volumetric video data comprises at least one time period during which a computational requirement for rendering or decoding changes at least a threshold amount; and
    including, in a bitstream, an indication of the change in the computational requirement for rendering or decoding of the volumetric video data during the at least one time period, wherein the indication of the change in the computational requirement for rendering or decoding comprises an indication of a lead time for the change in the computational requirement for rendering or decoding.

11. A non-transitory computer-readable medium comprising program instructions stored thereon which, when executed with at least one processor, cause the at least one processor to:
    determine that volumetric video data comprises at least one time period during which a computational requirement for rendering or decoding changes at least a threshold amount; and
    include, in a bitstream, an indication of the change in the computational requirement for rendering or decoding of the volumetric video data during the at least one time period, wherein the indication of the change in the computational requirement for rendering or decoding comprises an indication of a lead time for the change in the computational requirement for rendering or decoding.

12. An apparatus comprising:
    at least one processor; and
    at least one non-transitory memory and computer program code, wherein the at least one memory and the computer program code are configured to, with the at least one processor, cause the apparatus to:
        receive an indication of a change in at least one computational requirement for rendering or decoding of volumetric video data, wherein the indication of the change in the at least one computational requirement for rendering or decoding comprises an indication of a lead time for the change in one or more of the at least one computational requirement; and
        reallocate at least one computational resource based on the received indication.

13. The apparatus of claim 12, wherein receiving the indication comprises the at least one memory and the computer program code are configured to, with the at least one processor, cause the apparatus to:
    detect a flag in a stream associated with the volumetric video data, wherein the flag is configured to indicate that at least one syntax element related to the change in the at least one computational requirement for rendering or decoding is included in the stream.

14. The apparatus of claim 12, wherein the indication of the change in the at least one computational requirement for rendering or decoding comprises an indication of at least one of:
    a level change,
    a tier change, or
    a profile change
for an associated decoder.

15. The apparatus of claim 12, wherein the indication of the change in the at least one computational requirement for rendering or decoding comprises an indication of a duration for the change in one or more of the at least one computational requirement for rendering or decoding.

16. The apparatus of claim 12, wherein the at least one computational resource comprises at least one of:
    at least one memory buffer,
    at least one processor, or
    at least one power source.

17. The apparatus of claim 12, wherein reallocating the at least one computational resource based on the received indication comprises the at least one memory and the computer program code are configured to, with the at least one processor, cause the apparatus to one of:
    increase the at least one computational resource for rendering or decoding of the volumetric video data, or
    decrease the at least one computational resource for rendering or decoding of the volumetric video data.

18. The apparatus of claim 12, wherein the at least one computational requirement is associated with at least one of:
    an increase in a level of complexity of the volumetric video data during at least one time period,
    a decrease in the level of complexity of the volumetric video data during the at least one time period,
    an increase in a level of detail of the volumetric video data during the at least one time period, or
    a decrease in the level of detail of the volumetric video data during the at least one time period.

19. A method comprising:
    receiving an indication of a change in at least one computational requirement for rendering or decoding of volumetric video data, wherein the indication of the change in the at least one computational requirement for rendering or decoding comprises an indication of a lead time for the change in one or more of the at least one computational requirement; and
    reallocating at least one computational resource based on the received indication.

20. A non-transitory computer-readable medium comprising program instructions stored thereon which, when executed with at least one processor, cause the at least one processor to:
    receive an indication of a change in at least one computational requirement for rendering or decoding of volumetric video data, wherein the indication of the change in the at least one computational requirement for rendering or decoding comprises an indication of a lead time for the change in one or more of the at least one computational requirement; and
    reallocate at least one computational resource based on the received indication.

* * * * *